(12) United States Patent
Aoki

(10) Patent No.: US 7,684,120 B2
(45) Date of Patent: Mar. 23, 2010

(54) OPTICAL PRODUCT AND METHOD OF MANUFACTURING THE OPTICAL PRODUCT

(75) Inventor: Isamu Aoki, Chino (JP)

(73) Assignee: Seiko Epson Corporation, Tokyo (JP)

( * ) Notice: Subject to any disclaimer, the term of this patent is extended or adjusted under 35 U.S.C. 154(b) by 180 days.

(21) Appl. No.: 11/378,415

(22) Filed: Mar. 20, 2006

(65) Prior Publication Data

US 2006/0215123 A1    Sep. 28, 2006

(30) Foreign Application Priority Data

Mar. 22, 2005 (JP) ............................. 2005-081175
Jan. 16, 2006 (JP) ............................. 2006-007142

(51) Int. Cl.
G02B 27/14    (2006.01)
G02B 5/30    (2006.01)
G03B 21/00    (2006.01)

(52) U.S. Cl. ......................... 359/634; 359/496; 353/31
(58) Field of Classification Search ................. 359/129, 359/496, 618, 631, 629, 634, 636, 638–640, 359/831, 833–834; 353/31, 34, 81; 451/28, 451/41

See application file for complete search history.

(56) References Cited

U.S. PATENT DOCUMENTS

| | | | |
|---|---|---|---|
| 3,880,632 A | 4/1975 | Podvigalkina | |
| 6,141,150 A | 10/2000 | Ushiyama et al. | |
| 6,342,971 B1 * | 1/2002 | Hashizume et al. | 359/634 |
| 6,411,449 B1 | 6/2002 | Hashizume et al. | |
| 6,824,654 B2 | 11/2004 | Edlou et al. | |
| 7,066,603 B2 | 6/2006 | Akiya | |

RE39,859 E    9/2007    Ushiyama et al.

(Continued)

FOREIGN PATENT DOCUMENTS

CN    1514260 A    7/2004

(Continued)

*Primary Examiner*—Scott J Sugarman
*Assistant Examiner*—Dawayne A Pinkney
(74) *Attorney, Agent, or Firm*—Sughrue Mion, PLLC

(57) ABSTRACT

An optical product that is a cross dichroic prism formed by putting together vertexes forming right angles of a first prism element, a second prism element, a third prism element, and a fourth prism element made of glass that have a shape of a right isosceles triangle right prism and joining respective optical sides adjacent to one another among optical sides orthogonal to one another via dichroic films made of multi-layer films, wherein, when a section between the optical side of the first prism element and the optical side of the second prism element is set as a first junction, a section between the optical side of the second prism element and the optical side of the third prism element is set as a second junction, a section between the optical side of the third prism element and the optical side of the fourth prism element is set as a third junction, and a section between the optical side of the fourth prism element and the optical side of the first prism element is set as a fourth junction, an uppermost layer of the dichroic film provided on the optical side of any one of the first to the fourth junctions is made of a silicon oxide layer and the silicon oxide layer of the uppermost layer of the dichroic film and the optical side are joined according to an optical contact method.

6 Claims, 21 Drawing Sheets

U.S. PATENT DOCUMENTS

| | | |
|---|---|---|
| 2004/0179260 A1 | 9/2004 | Edlou et al. |
| 2009/0185279 A1* | 7/2009 | Goto .................. 359/629 |

FOREIGN PATENT DOCUMENTS

| | | |
|---|---|---|
| EP | 03149415 | 6/1991 |
| EP | 03149516 | 6/1991 |
| EP | 1 008 567 A1 | 6/2000 |
| EP | 1 406 110 A1 | 4/2004 |
| JP | 6-331807 A | 12/1994 |
| JP | 09-005518 A | 1/1997 |
| JP | 9-15405 A | 1/1997 |
| JP | 9-309053 A | 12/1997 |
| JP | 2000-329912 A | 11/2000 |
| JP | 2002-189109 A | 7/2002 |
| JP | 2003-075614 A | 3/2003 |
| JP | 2003-294937 A | 10/2003 |
| JP | 2004-163714 A | 6/2004 |
| JP | 2004-279495 A | 10/2004 |

* cited by examiner

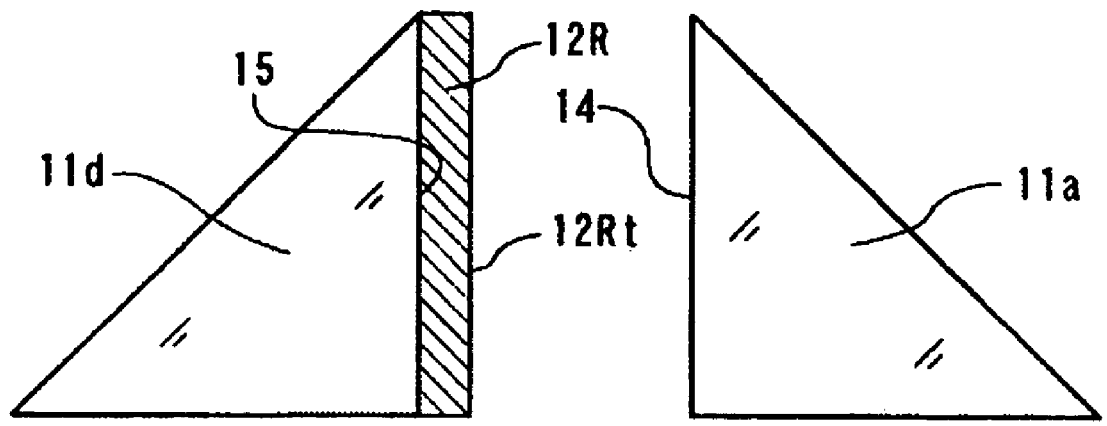
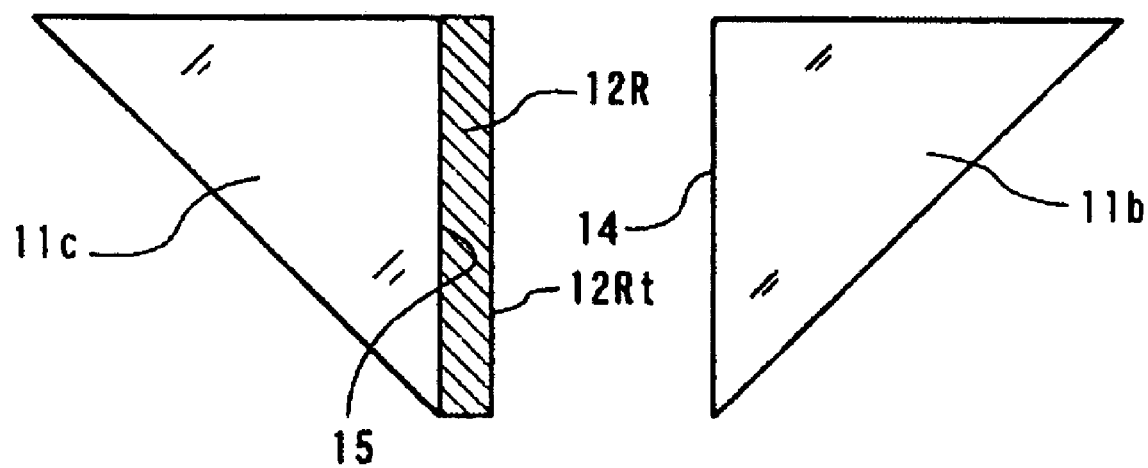
FIG. 2

|  | G 1 | R 1 | R 2 | B 1 | B 2 |
|---|---|---|---|---|---|
| FIRST EMBODIMENT | 0 | 0 | 0 | 0 | 0 |
| THIRD EMBODIMENT | 1 | 1 | 1 | 0 | 0 |
| COMPARATIVE EXAMPLE 1 | 2 | 1 | 2 | 2 | 1 |
| COMPARATIVE EXAMPLE 2 | 2 | 1 | 1 | 1 | 1 |

FIG.20

R REFLECTING FILM 12R
DICHROIC R FILM
(DESIGN WAVELENGTH λ=850nm)

| LAYER | OPTICAL FILM THICKNESS | SUBSTANCE |
|---|---|---|
| FIRST LAYER | 1.28 λ | Ta2O5 |
| SECOND LAYER | 0.41 λ | SiO2 |
| THIRD LAYER | 1.23 λ | Ta2O5 |
| FOURTH LAYER | 0.98 λ | SiO2 |
| FIFTH LAYER | 1.11 λ | Ta2O5 |
| SIXTH LAYER | 0.76 λ | SiO2 |
| SEVENTH LAYER | 1.14 λ | Ta2O5 |
| EIGHTH LAYER | 0.79 λ | SiO2 |
| NINTH LAYER | 1.11 λ | Ta2O5 |
| TENTH LAYER | 0.84 λ | SiO2 |
| ELEVENTH LAYER | 1.14 λ | Ta2O5 |
| TWELFTH LAYER | 0.68 λ | SiO2 |
| THIRTEENTH LAYER | 1.16 λ | Ta2O5 |
| FOURTEENTH LAYER | 0.72 λ | SiO2 |
| FIFTEENTH LAYER | 1.13 λ | Ta2O5 |
| SIXTEENTH LAYER | 0.82 λ | SiO2 |
| SEVENTEENTH LAYER | 1.12 λ | Ta2O5 |
| EIGHTEENTH LAYER | 0.81 λ | SiO2 |
| NINETEENTH LAYER | 1.10 λ | Ta2O5 |
| TWENTIETH LAYER | 0.97 λ | SiO2 |
| TWENTY-FIRST LAYER | 1.20 λ | Ta2O5 |
| TWENTY-SECOND LAYER | 0.41 λ | SiO2 |
| TWENTY-THIRD LAYER | 1.15 λ | Ta2O5 |
| TWENTY-FOURTH LAYER | 1.30 λ | SiO2 |
| TWENTY-FIFTH LAYER | 1.18 λ | Ta2O5 |
| TWENTY-SIXTH LAYER | 0.44 λ | SiO2 |
| TWENTY-SEVENTH LAYER | 0.10 λ | Ta2O5 |
| UPPERMOST LAYER | 0.69 λ | SiO2 |

B REFLECTING FILM 12B
DICHROIC B FILM
(DESIGN WAVELENGTH λ=525nm)

| LAYER | OPTICAL FILM THICKNESS | SUBSTANCE |
|---|---|---|
| FIRST LAYER | 0.29 λ | SiO2 |
| SECOND LAYER | 0.48 λ | Ta2O5 |
| THIRD LAYER | 0.91 λ | SiO2 |
| FOURTH LAYER | 1.10 λ | Ta2O5 |
| FIFTH LAYER | 0.75 λ | SiO2 |
| SIXTH LAYER | 1.17 λ | Ta2O5 |
| SEVENTH LAYER | 0.78 λ | SiO2 |
| EIGHTH LAYER | 1.25 λ | Ta2O5 |
| NINTH LAYER | 0.78 λ | SiO2 |
| TENTH LAYER | 1.23 λ | Ta2O5 |
| ELEVENTH LAYER | 0.76 λ | SiO2 |
| TWELFTH LAYER | 1.29 λ | Ta2O5 |
| THIRTEENTH LAYER | 0.77 λ | SiO2 |
| FOURTEENTH LAYER | 1.25 λ | Ta2O5 |
| FIFTEENTH LAYER | 0.78 λ | SiO2 |
| SIXTEENTH LAYER | 1.24 λ | Ta2O5 |
| SEVENTEENTH LAYER | 0.77 λ | SiO2 |
| EIGHTEENTH LAYER | 1.25 λ | Ta2O5 |
| NINETEENTH LAYER | 0.78 λ | SiO2 |
| TWENTIETH LAYER | 1.18 λ | Ta2O5 |
| TWENTY-FIRST LAYER | 0.73 λ | SiO2 |
| TWENTY-SECOND LAYER | 1.13 λ | Ta2O5 |
| TWENTY-THIRD LAYER | 0.89 λ | SiO2 |
| TWENTY-FOURTH LAYER | 0.46 λ | Ta2O5 |
| UPPERMOST LAYER | 0.28 λ | SiO2 |

OPTICAL PRODUCT AND METHOD OF MANUFACTURING THE OPTICAL PRODUCT

BACKGROUND

1. Technical Field

The present invention relates to an optical element including a multilayer film and a method of manufacturing the same, and, more particularly to a cross dichroic prism for color combination or color separation used in a projector apparatus and a method of manufacturing the same.

2. Related Art

A multi-plate projector often adopts a system for subjecting white light to color separation to illuminate valves for displaying images of respective colors and, after combining the images of the respective colors, projecting an image obtained by combining the images on a screen with a projection lens. A cross dichroic prism is one of optical products (optical components) suitable for separating white light into three colors and composing a three-color screen.

A structure of a cross dichroic prism in the past is shown in section in FIG. 22. In a cross dichroic prism 90 shown in the figure, dichroic films 92 made of multilayer films are formed on respective one surfaces of four prisms 91a to 91d of a triangular prism shape obtained by dividing the cross dichroic prism 90 into four pieces. The dichroic films 92 are bonded by an adhesive 93 having an optical characteristic substantially equivalent to that of a base material of the prisms. In the figure, the dichroic films 92 and the adhesive 93 are shown with sufficient thicknesses in order to illustrate presence thereof. However, as publicly known, actual thicknesses of the dichroic films 92 and the adhesive 93 are very small, for example, about several tens micrometers. The same holds true for other drawings attached to this specification.

FIG. 23 is another example of the cross dichroic prism. In a cross dichroic prism 95 shown in the figure, first, a pair of prisms divided into two that sandwich a dichroic film 92 made of a multilayer film are formed by four prisms 91a to 91d of a triangular prism shape obtained by dividing the cross dichroic prism 95 into four pieces. Thereafter, the dichroic film 92 made of a multilayer film is formed in a junction of one of the pair of prisms divided into two. Junctions of the pair of prisms divided into two are bonded by an optical adhesive 93.

In a cross dichroic prism, it is effective for, in particular, prevention of blurring of an image and double images to form an optical path to be optically uniform because the formation of the optically uniform optical path improves an image quality. For example, it is desirable to make refractive power of members constituting the optical path uniform. As disclosed in JP-A-06-331807, it is important for improvement of performance of the cross dichroic prism to highly accurately manage uniformity of refractive indexes of members constituting respective prisms. As disclosed in JP-A-09-015405, since a level difference occurs in the dichroic film 92 due to the thickness of the adhesive 93 in the constitution of the dichroic prism 90 in the past shown in FIG. 22, it is desirable to adopt the constitution shown in FIG. 23.

In both the constitutions, since a part of the optical path is formed by the adhesive 93, it is important for further improvement of performance of the dichroic prisms 90 and 95 to make an optical characteristic of the adhesive 93 identical with that of the prisms 91a to 91d. Therefore, an adhesive having a refractive index after hardening substantially the same as that of glass is developed as an optical adhesive.

However, although the adhesive is hardened by polymerization due to heat or polymerization due to light, it is difficult to stably and uniformly harden the adhesive so as to have a refractive index same as that of glass. For example, refractive power after hardening fluctuates more or less because of fluctuation in components of materials of the adhesive and fluctuation in hardening conditions. Moreover, although there are more than one type of glass adoptable as prisms, types of the glass adoptable as prisms are limited unless the adhesive corresponds to the types of the glass.

SUMMARY

An advantage of some aspects of the invention is to provide an optical product with a multilayer film held therein like a cross dichroic prism, the optical product being capable of reducing an influence of an adhesive used for joining to be as small as possible, and a method of manufacturing the optical product.

Therefore, according to an aspect of the invention, optical elements are joined or stuck together according to an optical contact method to make it possible to completely eliminate an influence of an adhesive. The optical contact is publicly known as a technique for grinding glass faces to form two surfaces strictly matching each other and closely attaching or welding the surfaces without an adhesive. The optical contact is considered as a joining method in which, by highly accurately grinding surfaces of glass substrates into planes and closely attaching the planes, hydroxyl groups on the surfaces are hydrogen-bonded each other or covalent-bonded according to dehydrogenation condensation. An effect of the optical contact is rarely found in bonding other than bonding of surfaces of a glass substrate.

On the other hand, according to the aspect of the invention, an uppermost layer of a multilayer film is formed as a silicon oxide layer, whereby a surface of the multilayer film is given the same conditions as glass face. Glass substrates serving as optical elements are joined to each other with the multilayer film put between the optical elements such that an optical product including the multilayer film can be manufactured without an adhesive.

In other words, according to the aspect of the invention, since the uppermost layer of the multilayer film is formed as the silicon oxide layer, it is possible to make the surface of the multilayer film equivalent to surfaces of glass that can be joined according to the optical contact method. Therefore, it is possible to join one optical element and the other optical element to each other with the multilayer film put between the optical elements according to the optical contact method. Consequently, since there is no adhesive layer in a junction of an optical product obtained, it is possible to nearly completely prevent deterioration in optical performance due to the adhesive layer described above.

Further, according to the aspect of the invention, since it is possible to join plural optical elements to one another with multilayer films put among the optical elements without forming layers of an adhesive. This makes it possible to maintain, even if a multilayer film is further formed on a surface extending over the plural optical elements, performance of the multilayer films. In other words, on the surface extending over the plural optical elements joined by the adhesive, there is a portion where the multilayer film is formed on an adhesive layer. Thus, it is likely that the multilayer film is warped in that portion or a film thickness fluctuates to make it impossible to obtain desired performance. On the other hand, there is no such likelihood in the manufacturing method according to the aspect of the invention.

As described above, when multilayer films having different kinds of performance are formed on two surfaces of one optical element in order to prevent a level difference of a multilayer film, both the multilayer films affect each other less if a boundary portion of the multilayer films is increased in size. However, an effective area of an optical path is reduced. If the multilayer film is present on an optical product or inside the optical product, there is no way to avoid an influence of the boundary portion. On the other hand, if a multilayer film is formed anew on a surface extending over optical elements joined according to the optical contact method, multilayer films do not interfere with each other and it is possible to prevent formation of a gap that affects an optical path.

According to a first aspect of the invention, there is provided an optical product that is a cross dichroic prism formed by putting together vertexes forming right angles of a first prism element, a second prism element, a third prism element, and a fourth prism element made of glass that have a shape of a right isosceles triangle right prism and joining respective optical sides adjacent to one another among optical sides orthogonal to one another via dichroic films made of multilayer films. When a section between the optical side of the first prism element and the optical side of the second prism element is set as a first junction, a section between the optical side of the second prism element and the optical side of the third prism element is set as a second junction, a section between the optical side of the third prism element and the optical side of the fourth prism element is set as a third junction, and a section between the optical side of the fourth prism element and the optical side of the first prism element is set as a fourth junction, an uppermost layer of the dichroic film provided on the optical side of any one of the first to the fourth junctions is made of a silicon oxide layer. The silicon oxide layer of the uppermost layer of the dichroic film and the optical side are joined according to an optical contact method.

The cross dichroic prism is formed by joining optical sides of both surfaces forming apical angles assuming right angles of four prisms, which have a shape of a right isosceles triangle right prism, via dichroic films made of multilayer films, respectively. Four junctions cross one another in a cross shape. It is possible to reduce deterioration in optical performance due to an adhesive layer by adopting joining by the optical contact method in at least one of the four junctions.

It is preferable that the dichroic film in the first junction and the dichroic film in the third junction are a continuous dichroic film that is continuous over these junctions.

It is possible to reduce an optical influence due to end faces or level differences of the dichroic films by forming one dichroic film of parallel junctions among the four junctions crossing one another in a cross shape as a continuous film extending over the junctions.

It is preferable that each of an end face of the dichroic film in the second junction and an end face of the dichroic film in the fourth junction is joined to the continuous dichroic film, which is provided over the first junction and the third junction and a lowermost layer and an uppermost layer of which are made of silicon oxide layers.

The end faces of the dichroic films of the second junction and the fourth junction separated from each other are joined to the continuous dichroic film extending over the two junctions orthogonal to these junctions according to the optical contact method. Thus, it is possible to reduce an optical influence due to the end faces of the dichroic films and improve optical uniformity.

It is preferable that the silicon oxide layer of the uppermost layer of the continuous dichroic film and the optical side in the first junction and the third junction are joined and the silicon oxide layer of the dichroic film of each of the second junction and the fourth junction and the optical side are joined according to the optical contact method, respectively.

It is possible to completely prevent deterioration in optical performance due to an adhesive layer by joining all of the four junctions according to the optical contact method because there is no layer of an adhesive in an area effective as an optical path.

It is preferable that the silicon oxide layer of the uppermost layer of the dichroic film and the optical side are joined by an adhesive layer in the second junction and the fourth junction and a silicon oxide layer of an uppermost layer of the continuous dichroic film, a lowermost layer and the uppermost layer of which are made of silicon oxide layers, and the optical side are joined according to the optical contact method in the first junction and the third junction.

In the cross dichroic prism having this structure, since two each of the four prism elements are joined by an adhesive, respectively, to manufacture two prism pairs, the manufacturing is easy. It is possible to reduce an optical influence due to end faces of the dichroic films according to formation of the continuous dichroic film. Further, it is possible to join the end faces of the dichroic films in the first junction and the third junction orthogonal to the continuous dichroic film, both the lowermost layer and the uppermost layer of which are made of silicon oxide layers, to the continuous dichroic film, respectively, according to the optical contact method. Moreover, it is possible to reduce an optical influence due to the end faces of the dichroic films.

It is preferable that the silicon oxide layer of the uppermost layer of the dichroic film and the optical side are joined by an adhesive layer in the second junction, and a silicon oxide layer of an uppermost layer of the continuous dichroic film, a lowermost layer and the uppermost layer of which are made of silicon oxide layers, and the optical side are joined according to the optical contact method in the first junction and the third junction, and the silicon oxide layer of the uppermost layer of the dichroic film and the optical side are joined according to the optical contact method in the fourth junction.

In the cross dichroic prism having this structure, it is possible to join the end faces of the dichroic films in the first junction and the third junction orthogonal to the continuous dichroic film, both the lowermost layer and the uppermost layer of which are made of silicon oxide layers, to the continuous dichroic film, respectively, according to the optical contact method. It is possible to reduce an optical influence due to the end faces of the dichroic films.

It is preferable that a silicon oxide layer is provided to cover two optical sides opposed to a surface on which the continuous dichroic film is provided and an end face of the dichroic film between the optical sides. The silicon oxide layer and the continuous dichroic film are joined according to the optical contact method.

It is possible to make the joining by the optical contact method secure by providing the silicon oxide layer that covers the two optical sides parallel to each other and the end face of the dichroic film in the junction between the optical sides.

It is preferable that gaps are provided on the outside of optically effective areas of one or more of the first junction, the second junction, the third junction, and the fourth junction and an adhesive is filled in the gaps.

The outside of the optically effective areas, for example, edges or corner portions of an optical product such as a prism manufactured by combining optical elements are not used as optical paths in many cases. Since the adhesive is filled in the gaps provided in the optically uninfluential areas of the junction, it is possible to further improve reliability of the junction and provide the optical product as an optical product having high performance and higher reliability.

It is preferable that reinforcing members are joined to upper surfaces and/or lower surfaces of the first prism element, the second prism element, the third prism element, and the fourth prism element to extend over these elements.

Since it is possible to integrate the four prism elements using the reinforcing members, it is possible to further improve reliability of the junction and provide an optical product having high performance and higher reliability.

According to a second aspect of the invention, there is provided a method of manufacturing an optical product including, in manufacturing a cross dichroic prism by putting together vertexes forming right angles of a first prism element, a second prism element, a third prism element, and a fourth prism element made of glass that have a shape of a right isosceles triangle right prism and joining optical sides adjacent to one another among optical sides orthogonal to one another via dichroic films made of multilayer films, respectively: a first film forming step of forming a first dichroic film made of a multilayer film on one of optical sides orthogonal to each other of the first prism element or the fourth prism element; a first joining step of joining, via the first dichroic film, the optical side of the prism element not provided with the first dichroic film of the first prism element or the fourth prism element and the optical side provided with the dichroic film of the other prism element to form a first prism pair; a second film forming step of forming a first dichroic film made of a multilayer film on one of optical sides orthogonal to each other of the second prism element or the third prism element; a second joining step of joining, via the first dichroic film, the optical side of the prism element not provided with the first dichroic film of the second prism element or the third prism element and the optical side provided with the dichroic film of the other prism element to form a second prism pair; a surface leveling step of leveling optical hypotenuse surfaces of the first prism pair and the second prism pair to form adherable surfaces; a third film forming step of forming a second dichroic film made of a multilayer film on one of optical hypotenuse surfaces of the first prism element or the second prism element; and a third joining step of joining the second dichroic film of the prism pair formed in the third film forming step and the optical hypotenuse surface of the prism pair not provided with the second dichroic film. The cross dichroic film is obtained by using one or more of a first combination of the first film forming step of forming the first dichroic film, an uppermost layer of which is made of a silicon oxide layer, and the first joining step of joining the silicon layer of the uppermost layer of the first dichroic film and the optical sides of the first prism element and the fourth prism element according to the optical contact method to form the first prism pair, a second combination of the second film forming step of forming the first dichroic film, an uppermost layer of which is made of a silicon oxide layer, and the second joining step of joining the silicon layer of the uppermost layer of the first dichroic film and the optical sides of the second prism element and the third prism element according to the optical contact method to form the second prism pair, and a third combination of the third film forming step of forming the second dichroic film, an uppermost layer of which is made of a silicon oxide layer, and the third joining step of joining the silicon oxide layer of the uppermost layer of the second dichroic film and the optical hypotenuse surfaces of the first prism pair and the second prism pair according to the optical contact method.

It is possible to prevent deterioration in optical performance due to an adhesive layer as much as possible by adopting joining by the optical contact method in at least one of the four junctions crossing one another in a cross shape in the cross dichroic prism.

It is preferable that the method of manufacturing an optical product includes the first combination, the second combination, and the third combination.

It is possible to completely prevent deterioration in optical performance due to an adhesive layer by joining all of the four junctions according to the optical contact method.

It is preferable that the method of manufacturing an optical product includes: a first joining step of joining the first prism element and the fourth prism element using an adhesive to form the first prism pair; a second joining step of joining the second prism element and the third prism element using an adhesive to form the second prism pair; and the third combination that includes a third film forming step of providing a silicon oxide layer of a lowermost layer.

In the method of manufacturing a cross dichroic prism, it is possible to join end faces of the respective dichroic films orthogonal to a continuous dichroic film, both a lowermost layer and an uppermost layer of which are made of silicon oxide layers, to the continuous dichroic film according to the optical contact method. Since the end faces of the dichroic films are not present inside the cross dichroic prism, it is possible to reduce an optical influence due to the end faces of the dichroic films.

It is preferable that the method of manufacturing an optical product includes: the first combination; a second joining step of joining the optical side of the second prism element and the first dichroic film of the third prism element using an adhesive to form the second prism pair; and the third combination that includes a third film forming step of providing a silicon oxide layer of a lowermost layer.

In the method of manufacturing a cross dichroic prism, it is possible to join end faces of the respective dichroic films orthogonal to a continuous dichroic film, both a lowermost layer and an uppermost layer of which are made of silicon oxide layers, to the continuous dichroic film according to the optical contact method. It is possible to reduce an optical influence due to the end faces of the dichroic films.

BRIEF DESCRIPTION OF THE DRAWINGS

The invention will be described with reference to the accompanying drawings, wherein like numbers reference like elements.

FIG. 2 is a sectional view showing a first film forming step in a manufacturing process for the cross dichroic prism shown in FIG. 1.

FIG. 20 is a table in which the numbers of times respective rays traverse an adhesive layer in FIGS. 16 to 19 are put in order.

FIG. 21A is a table showing an example of a constitution of a dichroic film that reflects a color red.

FIG. 21B is a table showing an example of a constitution of a dichroic film that reflects a color blue.

DESCRIPTION OF EXEMPLARY
EMBODIMENTS

Embodiments of the invention will be hereinafter explained. However, the invention is not limited to the embodiments.

An optical product according to an embodiment of the invention is an optical product including two or more optical elements that have optical planes of glass to be joined to each other. A multilayer film, an uppermost layer of which is a silicon oxide film, is formed on an optical plane of a first optical element. An optical plane joinable to the optical plane, on which the multilayer film is formed, is formed on a second optical element. The optical plane of the first optical element, on which the multilayer film is formed, and the optical plane of the second optical element are joined according to an optical contact method.

Examples of a specific optical product include a cross dichroic prism. The cross dichroic prism is an optical product formed by putting together vertexes forming right angles of a first prism element, a second prism element, a third prism element, and a fourth prism element made of glass that have a shape of a right isosceles triangle right prism and joining respective optical sides adjacent to one another among optical sides orthogonal to one another via dichroic films made of multilayer films. The cross dichroic prism is used for trichromatic color separation for white light and trichromatic color combination for projected light.

It is optional to decide which of the four prism elements is selected as the first prism element. The four prism elements have a relation in which the second prism element and the fourth prism elements are provided on both sides of the first prism element and the third prism element is opposed to the first prism element.

In the optical product according to the aspect of the invention, when a section between the optical side of the first prism element and the optical side of the second prism element is set as a first junction, a section between the optical side of the second prism element and the optical side of the third prism element is set as a second junction, a section between the optical side of the third prism element and the optical side of the fourth prism element is set as a third junction, and a section between the optical side of the fourth prism element and the optical side of the first prism element is set as a fourth junction, an uppermost layer of the dichroic film in any one of the first to the fourth junctions is made of a silicon oxide layer. The silicon oxide layer of the uppermost layer of the dichroic film and the optical side are joined according to an optical contact method.

First Embodiment

Figure 1:
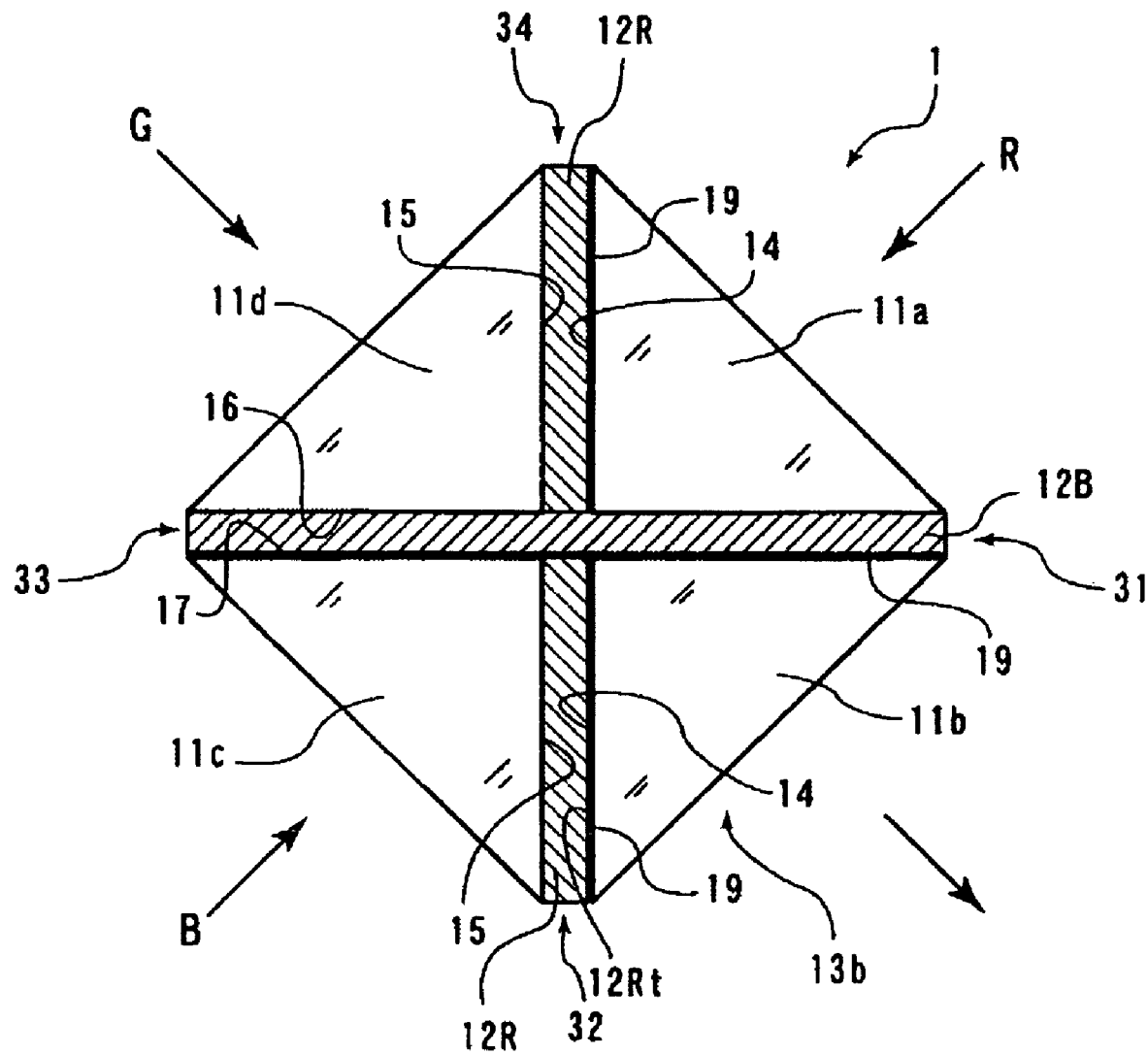
FIG. 1 is a sectional view showing a constitution of a cross dichroic prism in a first embodiment of the invention.

A constitution of a cross dichroic prism according to a first embodiment of the invention is shown in FIG. 1 using a section thereof. A cross dichroic prism (hereinafter, "dichroic prism") 1 is an optical product (an optical component) formed in substantially a regular square shape in section. In the cross dichroic prism, vertexes forming right angles of four prism elements, namely, a first prism element 11a, a second prism element 11b, a third prism elements 11c, and a fourth prism element 11d made of glass that have a shape of a right isosceles triangle right prism are put together to join respective optical sides adjacent to one another among optical sides orthogonal to one another via dichroic films 12R and 12B made of multilayer films. The first prism element 11a and the fourth prism element 11d are joined in a fourth junction 34 between the prism elements via the dichroic film 12R according to the optical contact method. The second prism element 11b and the third prism element 11c are joined in a second junction 32 between the prism elements via the dichroic film 12R according to the optical contact method. The dichroic film 12B is continuously provided over a first junction 31 between the first prism element 11a and the second prism element 11b and a third junction 33 between the third prism element 11c and the fourth prism element 11d. The first junction 31 and the third junction 33 are joined to each other via the dichroic film 12B according to the optical contact method. In other words, in the dichroic prism 1 in the first embodiment, all the junctions 31 to 34 are joined according to the optical contact method. In the drawing referred to below including FIG. 1, junctions joined according to the optical contact method are indicated by bold lines as junction surfaces (sections) 19 in order to facilitate explanations. This does not mean that the junction sections 19 by the optical contact method indicated by the bold lines have thickness. The same applies in the drawings referred to below.

The dichroic films 12R are semi-transparent films that efficiently reflect red light, for example, light with a wavelength of 850 nm. The dichroic film 12B is a semi-transparent film that efficiently reflects blue light, for example, light with a wavelength of 525 nm. Therefore, in the dichroic prism 1, red light R is reflected by the dichroic films 12R to change a direction. Blue light B is reflected by the dichroic film 12B to change a direction. Green light G is transmitted through the dichroic films 12R and 12B. According to such an action, the dichroic prism 1 can combine images of the respective colors and divide white light into rays of the respective colors. Thus, the dichroic prism 1 is one of important optical components in various optical apparatuses such as a projector.

Figure 3:
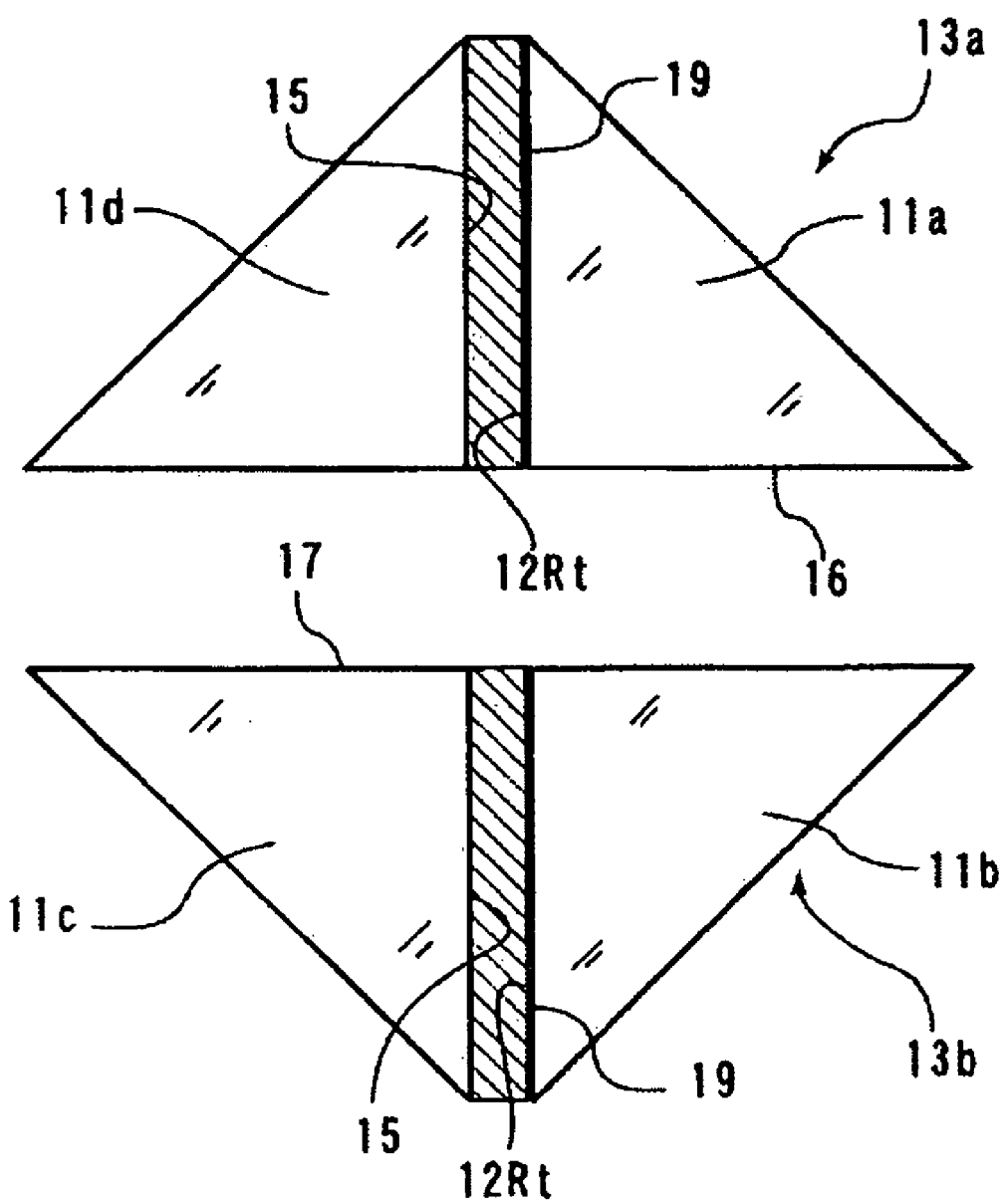
FIG. 3 is a sectional view showing a first joining step for manufacturing of two prism pairs in the manufacturing process for the cross dichroic prism shown in FIG. 1.
Figure 4:
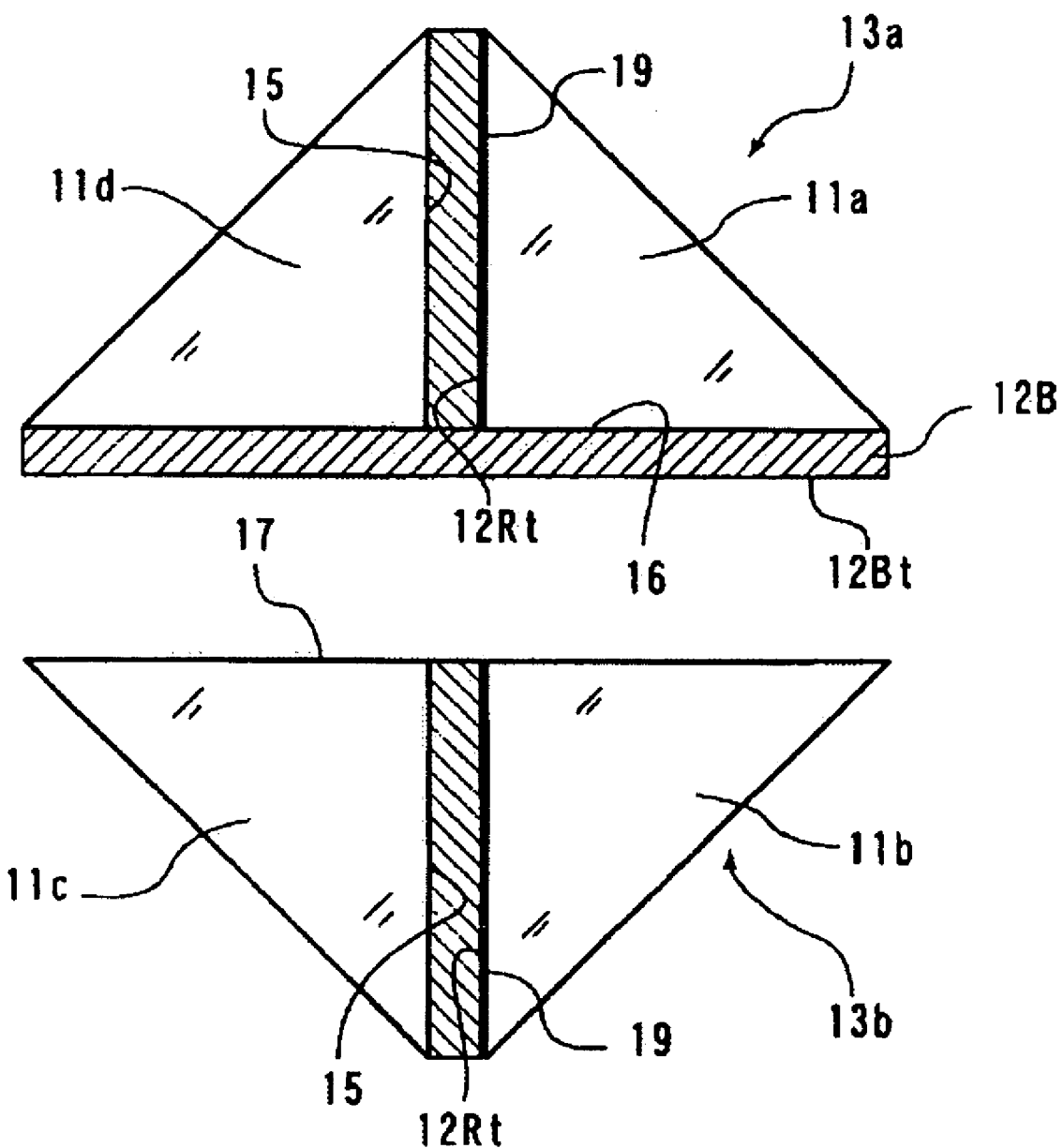
FIG. 4 is a sectional view showing a third film forming step of forming dichroic films on hypotenuse surfaces of the prism pairs in the manufacturing process for the cross dichroic prism shown in FIG. 1.

A manufacturing process for the dichroic prism 1 is schematically shown in FIGS. 2 to 4. As the first prism element 11*a* to the fourth prism element 11*d*, for example, borosilicate crown optical glass (a refractive index of a d line thereof is 1.51633) called BK7 is used. The first prism element 11*a* to the fourth prism element 11*d* have a shape of a right prism that is formed by moving a surface of a right isosceles triangle having one apical angle of 90 degrees and the remaining two apical angles of 45 degrees in the vertical direction. The dichroic film 12R or 12B is formed on one of two optical sides orthogonal to each other that form each of the apical angles assuming right angles of the first prism element 11*a* to the fourth prism element 11*d*. The first prism element 11*a* to the fourth prism element 11*d* are used in the same manner in other embodiments described later.

As shown in FIG. 2, the dichroic film 12R made of a multilayer film is formed as a first multilayer film on a first optical side 15 facing the first prism element 11*a* among the optical sides of the fourth prism element 11*d* according to the evaporation method (the first film forming step). In this case, it goes without saying that the dichroic film 12R may be provided on an optical side 14 facing the fourth prism element 11*d* of the first prism element 11*a*. The dichroic film 12R made of a multilayer film is formed on the first optical side 15 facing the second prism element 11*b* among the optical sides of the third prism element 11*c* according to the evaporation method (the second film forming step).

An example of a constitution of the dichroic film 12R that reflects the red light R is shown in FIG. 21A. The dichroic film 12R is designed to efficiently reflect light with a wavelength of 850 nm and designed to have a high reflectance for red light and a high transmittance for blue light and green light. The dichroic film 12R in this example is a thin film with thickness of about several tens micrometers formed by stacking a thin film of tantalum pentoxide ($Ta_2O_5$) and a thin film of silicon oxide ($SiO_2$) by twenty-eight layers in total. An uppermost layer 12Rt of the dichroic film 12R is formed as a silicon oxide layer.

Such a multilayer film is also called a dielectric multilayer film. It is possible to form the multilayer film using the vacuum evaporation method, the ion assist evaporation method, the ion plating method, the sputtering method, and the like. It is possible to form a thin film, which reflects or transmits a desired wavelength, by alternately stacking a layer with a high refractive index and a layer with a low refractive index made of an appropriate material at appropriate thicknesses. As a material of the layer with a high refractive index, it is possible to use titanium oxide ($TiO_2$), niobium pentoxide ($Nb_2O_5$), and the like other than tantalum oxide. As a material of the layer with a low refractive index, it is possible to use magnesium fluoride ($MgF_2$) and the like other than silicon oxide. In this embodiment, a thin film using silicon oxide is formed at least on an uppermost layer.

As shown in FIG. 3, the optical side 15 of the fourth prism element 11*d* on which the dichroic film 12R is formed and the optical side 14 of the first prism element 11*a* opposed to the optical side 15 are joined according to the optical contact method (the first joining step). Similarly, the optical side 15 of the third prism element 11*c* on which the dichroic film 12R is formed and the optical side 14 of the second prism element 11*b* opposed to the optical side 15 are joined according to the optical contact method (the second joining step).

Consequently, a first prism pair 13*a* of a right isosceles triangle right prism shape in which the first prism element 11*a* and the fourth prism element 11*d* are joined and a second prism pair 13*b* of a right isosceles triangle right prism shape in which the second prism element 11*b* and the third prism element 11*c* are joined are formed.

The optical contact method is publicly known as a method of directly joining glass faces each other. In this embodiment, the optical contact method is applicable in joining glass faces to each other with a multilayer film put between the glass faces rather than directly joining the glass faces. Therefore, first of all, the uppermost layer 12Rt of the multilayer film formed on the optical side 15 is formed as a silicon oxide film having the same principal components as glass such that coincidence of materials of substantial junctions of the glass optical side 14 opposed to the optical side 15 and the surface 12Rt of the dichroic film 12R is realized.

As shown in FIGS. 21A and 21B, in forming the multilayer film, accuracy of thickness of the dichroic film 12R is extremely high because the thickness is managed in the order of submicron. Therefore, it may be considered that a shape of a substrate surface, in this example, the optical side 15 of the fourth prism element 11*d* exactly has a surface shape of the uppermost layer 12Rt of the dichroic film 12R. It is also possible to secure accuracy of coincidence of surfaces necessary for joining optical surfaces according to the optical contact method by designing a shape of the optical side 15 of the fourth prism element 11*d* to coincide with a shape of the optical side 14 of the prism element 11*a* that is opposed to the optical side 15 for joining.

It is possible to finish the optical sides 15 and 14 orthogonal to each other, which are junction surfaces of the first prism element 11*a* to the fourth prism element 11*d*, to be in a highly-accurate state in which the optical sides have a sufficient degree of flatness, for example, surface roughness Ra equal to or lower than 0.5 nm and a degree of flatness (a PV value) equal to or lower than 0.5 μm according to optical grinding (highly accurate grinding). Moreover, it is desirable to clean junctions with chemical surface treatment by a chemical, gas, or the like or physical surface treatment by plasma or the like. Examples of the cleaning include cleaning by immersion in an alkali cleaning liquid (product name: cleaner B3, with concentration of 2%).

Since the same degree of flatness is secured even after the dichroic film 12R is formed on the optical side 15, when the optical side 15 of the fourth prism element 11*d* on the one hand is put together with the optical side 14 of the first prism element 11*a* on the other hand after forming the dichroic film 12R on the optical side 15, both the surfaces are attracted in vacuum because both the surfaces are highly flat surfaces. Joining strength is improved by heating the surfaces at 250° C. for one hour. A heating temperature is desirably 200 to 500° C. and more desirably 200 to 300° C.

According to the process shown in FIG. 3, two prism pairs, namely, the first prism pair 13a and the second prism pair 13b are manufactured. Optical hypotenuse surfaces 16 and 17 opposed to vertexes forming right angles of the first prism pair 13a and the second prism pair 13b are optically ground to be highly accurate planes in the same state as above (the surface leveling step).

Moreover, as shown in FIG. 4, the dichroic film 12B made of a multilayer film is formed as a second multilayer film according to the evaporation method on the optical hypotenuse surface 16 opposed to the right angles of the prism pair 13a that is one of the first prism pair 13a and the second prism pair 13b (the third film forming step). The dichroic film 12B is formed as a continuous dichroic film continuous over optical sides of the first prism element 11a and the fourth prism element 11d and an end face of the dichroic film 12R.

An example of a constitution of the dichroic film 12B that reflects the blue light B is shown in FIG. 21B. The dichroic film 12B is designed to efficiently reflect light with a wavelength of 525 nm and designed to have a high reflectivity for blue light and a high transmittance for red light and green light.

The dichroic film 12B in this example is a thin film having thickness of about several tens micrometers that is formed by stacking a thin film of tantalum pentoxide ($Ta_2O_5$) and a thin film of silicon oxide ($SiO_2$) by twenty-five layers in total. An uppermost layer 12Bt of the dichroic film 12B is formed as a silicon oxide layer.

Subsequently, the dichroic prism 1 shown in FIG. 1 is manufactured as an optical product by joining the optical hypotenuse surface 16 of the first prism pair 13a and the optical hypotenuse surface 17 of the second prism pair 13b according to the optical contact method (the third joining step).

Since surface accuracy of the surface 12Bt of the dichroic film 12B formed in the film forming step is also extremely high, if the optical hypotenuse surface 16 of one prism pair 13a is put together with the optical hypotenuse surface 17 of the other prism pair 13b in a state in which the dichroic film 12B is formed on the optical hypotenuse surface 16, both the surfaces are attracted in vacuum. Joining strength is improved by heating the surfaces at 250° C. for one hour. A heating temperature is desirably 200 to 500° C. and more desirably 200 to 300° C.

The cross dichroic prism 1 in this embodiment can completely eliminate an influence of a layer of an adhesive on an optical path. Therefore, in manufacturing a cross dichroic prism, performance deterioration of which is found in the past because of thickness or an optical characteristic of a layer of an adhesive, the manufacturing method in this embodiment is suitable.

Second Embodiment

Figure 5:
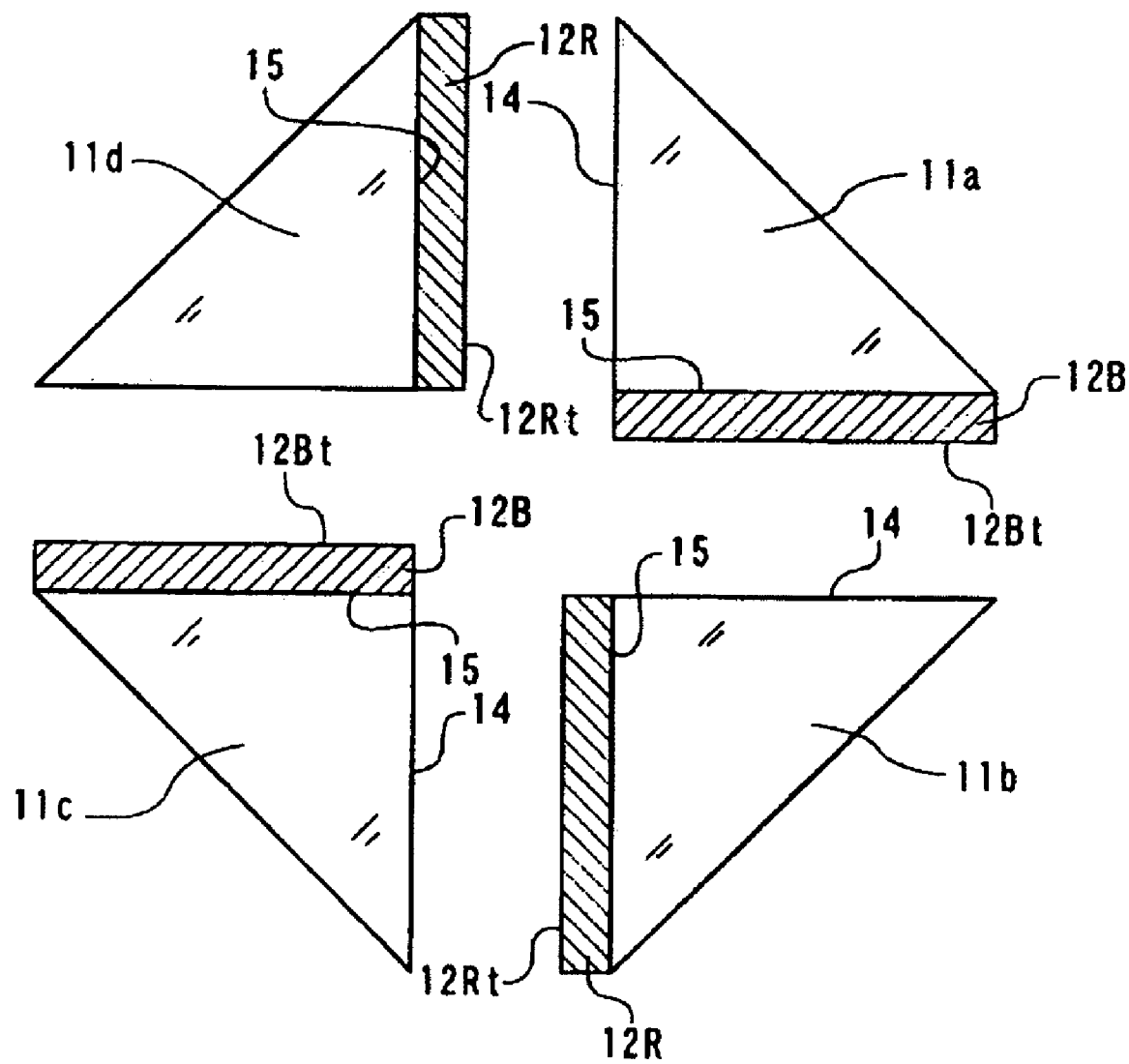
FIG. 5 is a sectional view showing first and second film forming steps in a manufacturing process for a cross dichroic prism in a second embodiment of the invention.
Figure 6:
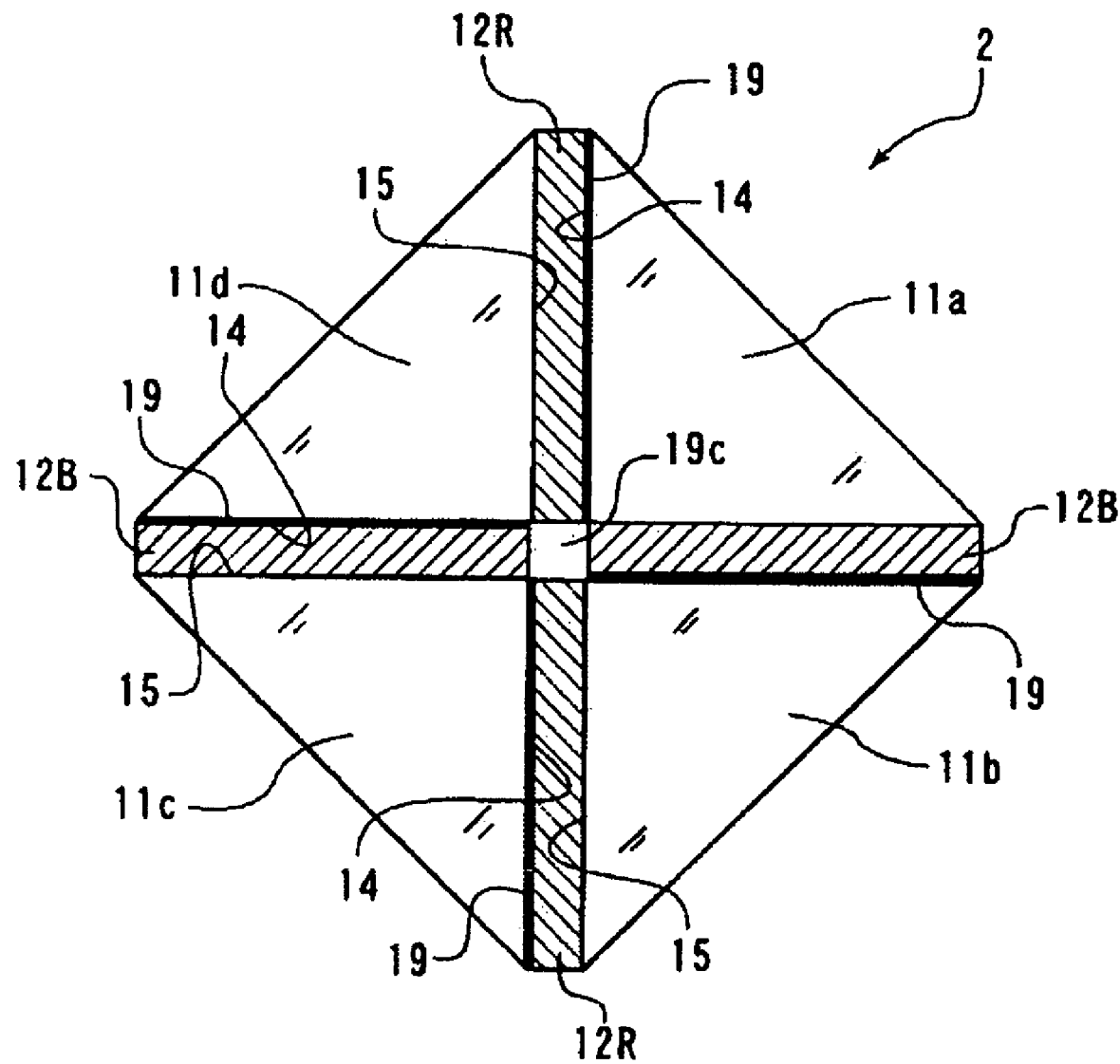
FIG. 6 is a sectional view showing a structure of the cross dichroic prism in the second embodiment manufactured after the step shown in FIG. 5.

Another embodiment of the invention is shown in FIGS. 5 and 6. In a cross dichroic prism 2 in this embodiment, the dichroic film 12R or 12B is formed on each of the optical sides 15 of the first prism elements 11a to the fourth prism element 11d (the first and second film forming steps). Thereafter, the optical sides 15 are joined to the optical sides 14 of the triangular prisms 11a to 11d opposed to the optical sides 15 (the first to third joining steps) to manufacture the dichroic prism 2. Since the steps of film formation and the steps of joining are the same as those in the first embodiment, explanations of the steps are omitted.

Figure 22:
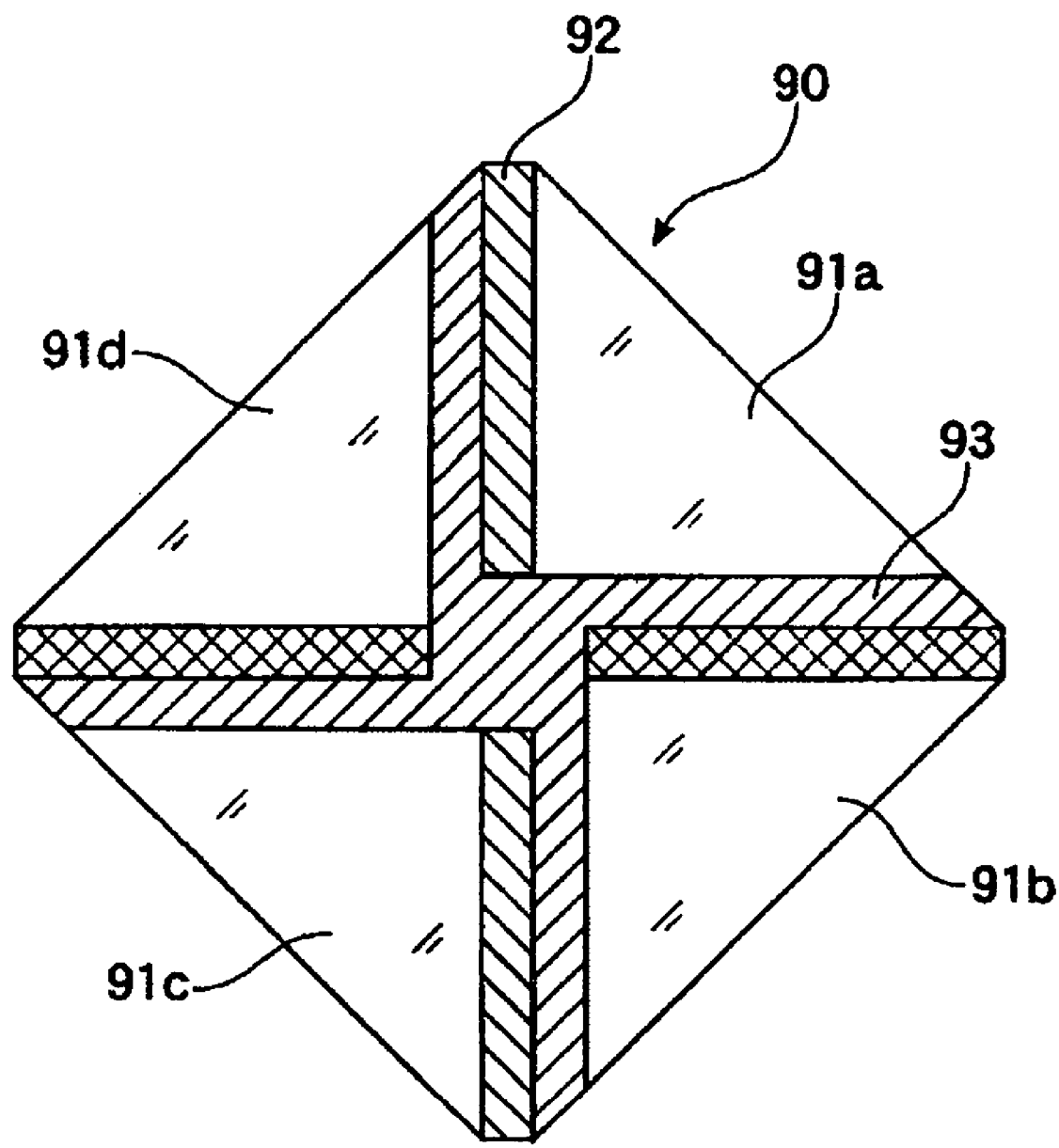
FIG. 22 is a sectional view showing a constitution of a cross dichroic prism in a comparative example 1.

It is possible to reduce the number of stages of manufacturing process for forming films on prism pairs and joining the prism pairs from two to one by adopting the manufacturing method in this embodiment. This makes it possible to simplify a manufacturing process for a dichroic prism. Moreover, since the junction sections 19 formed according to the optical contact method do not have thickness, the problem of formation of a level difference in a dichroic film due to thickness of an adhesive layer explained with reference to FIG. 22 does not occur. Therefore, it is possible to provide the dichroic prism 2 having high optical performance at low cost.

However, an area along a center axis 19c of the dichroic prism 2 is formed as an area in which it is possible to select presence of the dichroic films 12R and 12B according to a film forming method for the dichroic films 12R and 12B, that is, select whether both the dichroic films should be present, one of the dichroic films should be present, or no dichroic film should be present and the area should be in a hollow state. It is likely that the area is a section that is structurally and optically indefinite. In this regard, the dichroic prism 1 described in the first embodiment is more stable in terms of a structure and optical performance and is preferable.

Third Embodiment

Figure 7:
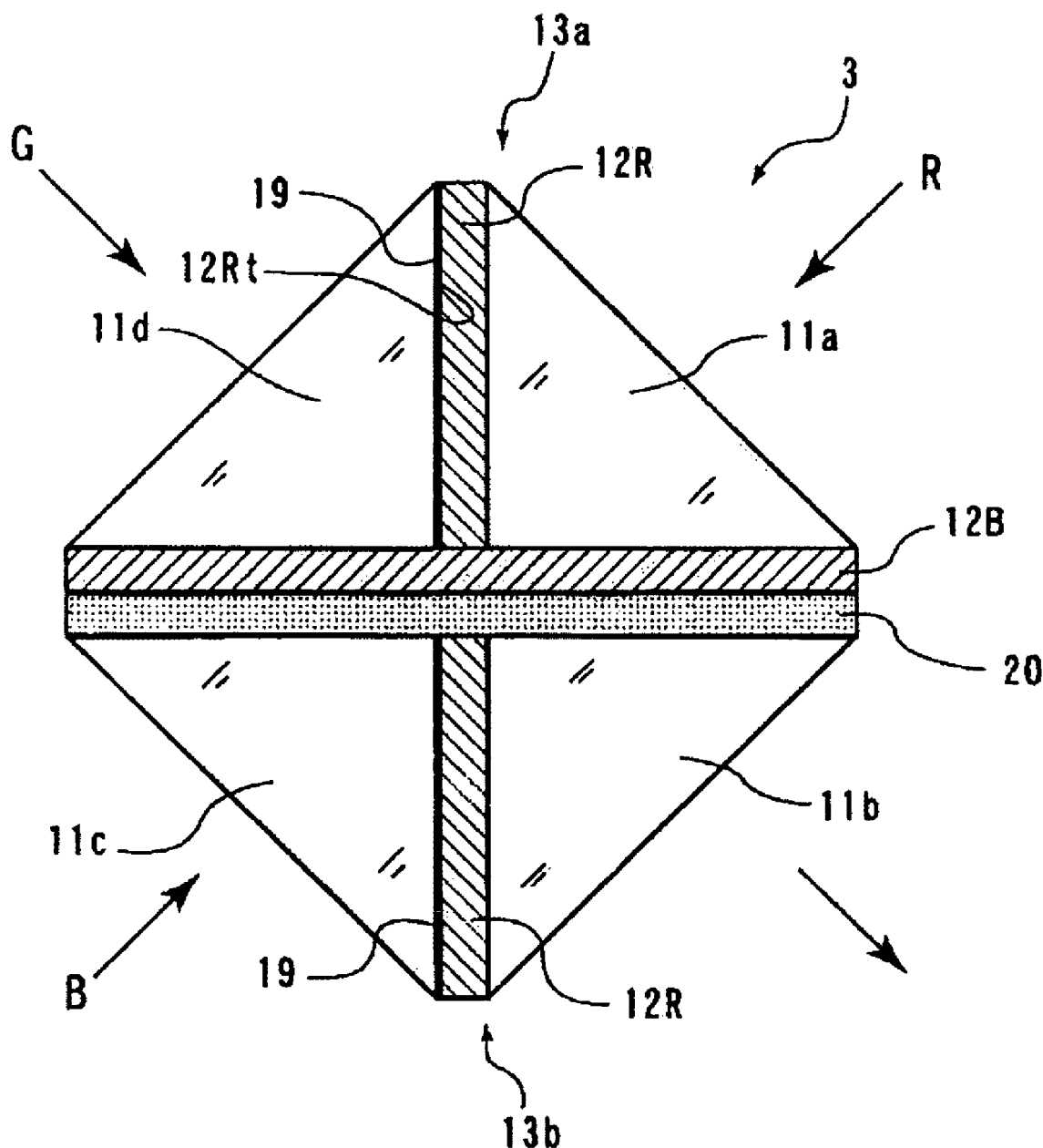
FIG. 7 is a sectional view showing a structure of a cross dichroic prism in a third embodiment of the invention.

Still another embodiment of the invention is shown in FIG. 7. In a cross dichroic prism 3 in this embodiment, the first prism element 11a to the fourth prism element 11d are used and the prism pairs 13a and 13b are manufactured according to the first film forming step and the first and the second joining steps shown in FIGS. 2 and 3. After the surface leveling step, the dichroic film 12B is formed on the optical hypotenuse surface 16 of the prism pair 13a and bonded to the optical hypotenuse surface 17 of the other prism pair 13b by an adhesive 20 optically having refractive power substantially equal to that of the prisms 11a to 11d.

In this manufacturing method, a surface of the dichroic film 12B is formed inside the dichroic prism 3 via a layer of the adhesive 20. Thus, it is impossible to completely eliminate an optical influence of the layer of the adhesive 20 as in the dichroic prism 1 or 2 in each of the embodiments described above. However, concerning junctions where the dichroic films 12R are formed, since the junctions are joined according to the optical contact method, it is possible to minimize an influence of the layer of the adhesive 20. Since the dichroic film 12B is joined via the adhesive 20, an uppermost layer thereof does not need to be a silicon oxide layer. Thus, there is an advantage that a degree of freedom of a constitution of the dichroic film 12B is improved.

As an adhesive that can be used in this embodiment, an optical adhesive that is hardened by UV light or visible light is desirable. It is possible to harden the adhesive by shedding light on the adhesive via the first prism element 11a to the fourth prism element 11d. Alternatively, a heat-hardening adhesive that is hardened by being heated to temperature of a degree not affecting the sections 19, which are joined according to the optical contact method, may be used. In this embodiment, an optical adhesive UT20 provided by Kabushiki Kaisha Ades is used as the adhesive. A joining jig is prepared to bring triangular prisms into contact with each other via this optical adhesive. Thereafter, a high-pressure mercury-vapor lamp (80 $W/cm^2$) is irradiated on the optical adhesive for ten minutes. A refractive index (d line) before hardening of the adhesive UT20 is 1.48 and a refractive index (d line) after hardening thereof is 1.52. Thus, the adhesive UT20 has a refractive index substantially close to BK7 adopted in the prisms.

When hardening conditions, in particular, irradiation of UV light is unstable, it is likely that hardening of an adhesive layer becomes non-uniform and an adhesive inevitably has a portion where a refractive index is lower than that of glass. Thus, refractive power is prevented from becoming non-uniform using a light source with sufficiently high power to prevent abnormality of an image display characteristic. As described above, if all junctions are joined according to the optical contact method, it is possible to prevent a deficiency due to the adhesive layer.

Fourth Embodiment

Figure 8:
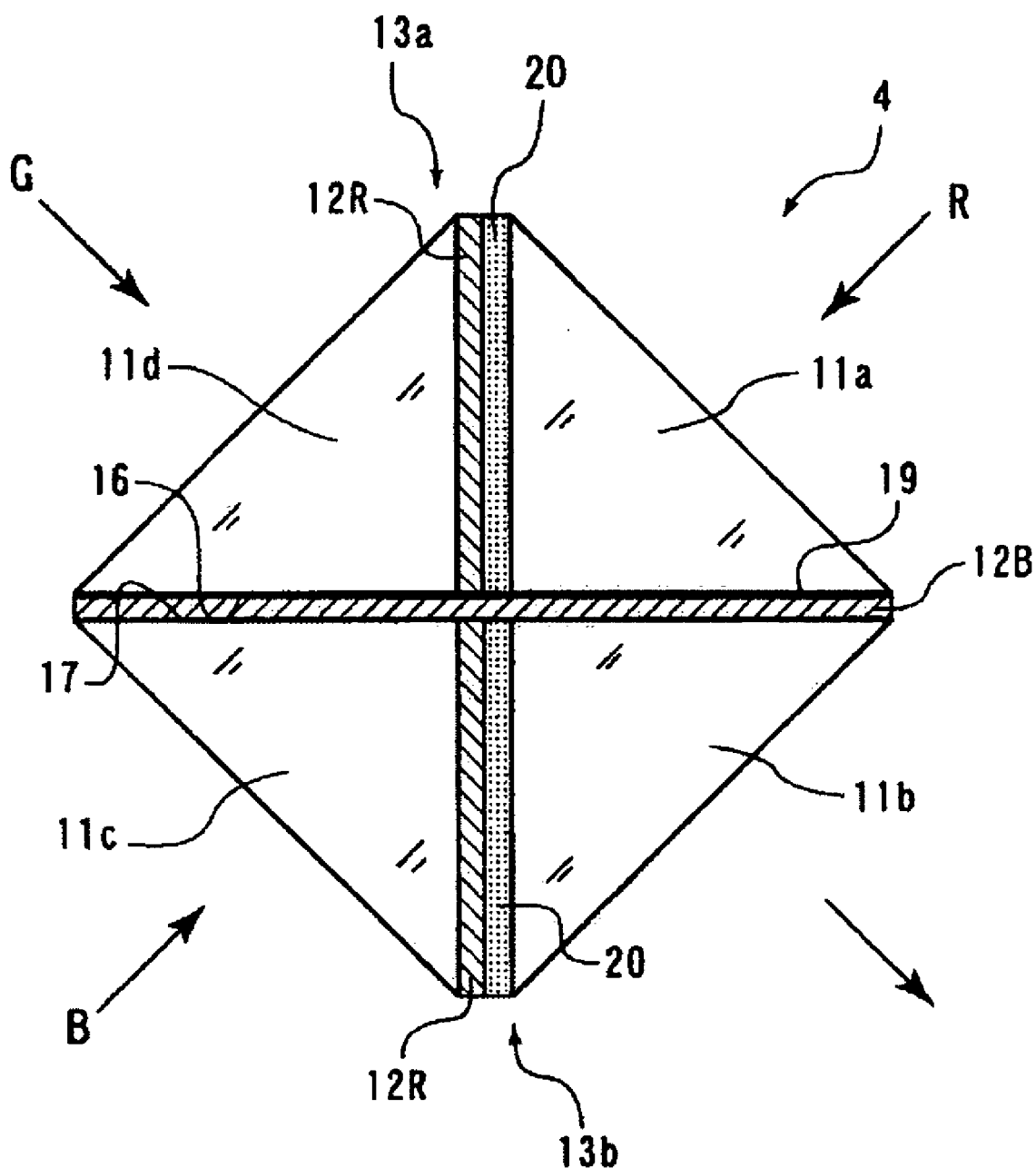
FIG. 8 is a sectional view showing a structure of a cross dichroic prism in a fourth embodiment of the invention.

Still another embodiment of the invention is shown in FIG. 8. In a cross dichroic prism 4 in this embodiment, the first prism element 11a to the fourth prism element 11d are used, the first prism pair 13a is manufactured by joining the first prism element 11a and the fourth prism element 11d via the adhesive layer 20 same as that in the third embodiment (the first joining step), and, similarly, the second prism pair 13b is manufactured by joining the second prism element 11b and the third prism element 11c via the adhesive layer 20 (the second joining step). Respective optical hypotenuse surfaces opposed to vertexes forming right angles of the first prism pair 13a and the second prism pair 13b are optically ground (the surface leveling step). The dichroic film 12B, which is made of a multilayer film and has silicon oxide layers in a first layer and an uppermost layer thereof, is formed as a second multilayer film according to the evaporation method on the optical hypotenuse surface opposed to the right angles of the prism pair 13a that is one of the first prism pair 13a and the second prism pair 13b (the third film forming step). The dichroic film 12B is a continuous dichroic film formed over optical sides of the two prism elements 11a and 11d. The respective optical hypotenuse surfaces of the first prism pair 13a and the second prism pair 13b are joined according to the optical contact method (the third joining step). This makes it possible to manufacture the cross dichroic prism 4 shown in FIG. 8.

It is easy to manufacture the cross dichroic prism 4 because two each of four prism elements are joined by an adhesive to manufacture two prism pairs. It is possible to reduce an optical influence due to end faces of dichroic films by forming a continuous dichroic film. Moreover, end faces of the respective dichroic films 12R orthogonal to the continuous dichroic film, both a lowermost layer and an uppermost layer of which are made of silicon oxide layers, come into contact with the continuous dichroic film and silicon oxide layers in the dichroic films 12R are exposed on the end faces. Thus, it is possible to join the end faces of the dichroic films 12R to silicon oxide layers on both sides of the continuous dichroic film 12B according to the optical contact method. Therefore, it is possible to join the end faces of the dichroic film 12R of the first prism pair 13a to the continuous dichroic film 12B according to the optical contact method by means of contact between silicon oxide of the dichroic films 12R and silicon oxide of the continuous dichroic film 12B. Consequently, the continuous dichroic film 12B and the dichroic films 12R are integrated and the end faces of the dichroic films 12R are not present in the cross dichroic prism 4. This makes it possible to reduce an optical influence due to the end faces of the dichroic film 12R and improve optical uniformity.

Fifth Embodiment

Figure 9:
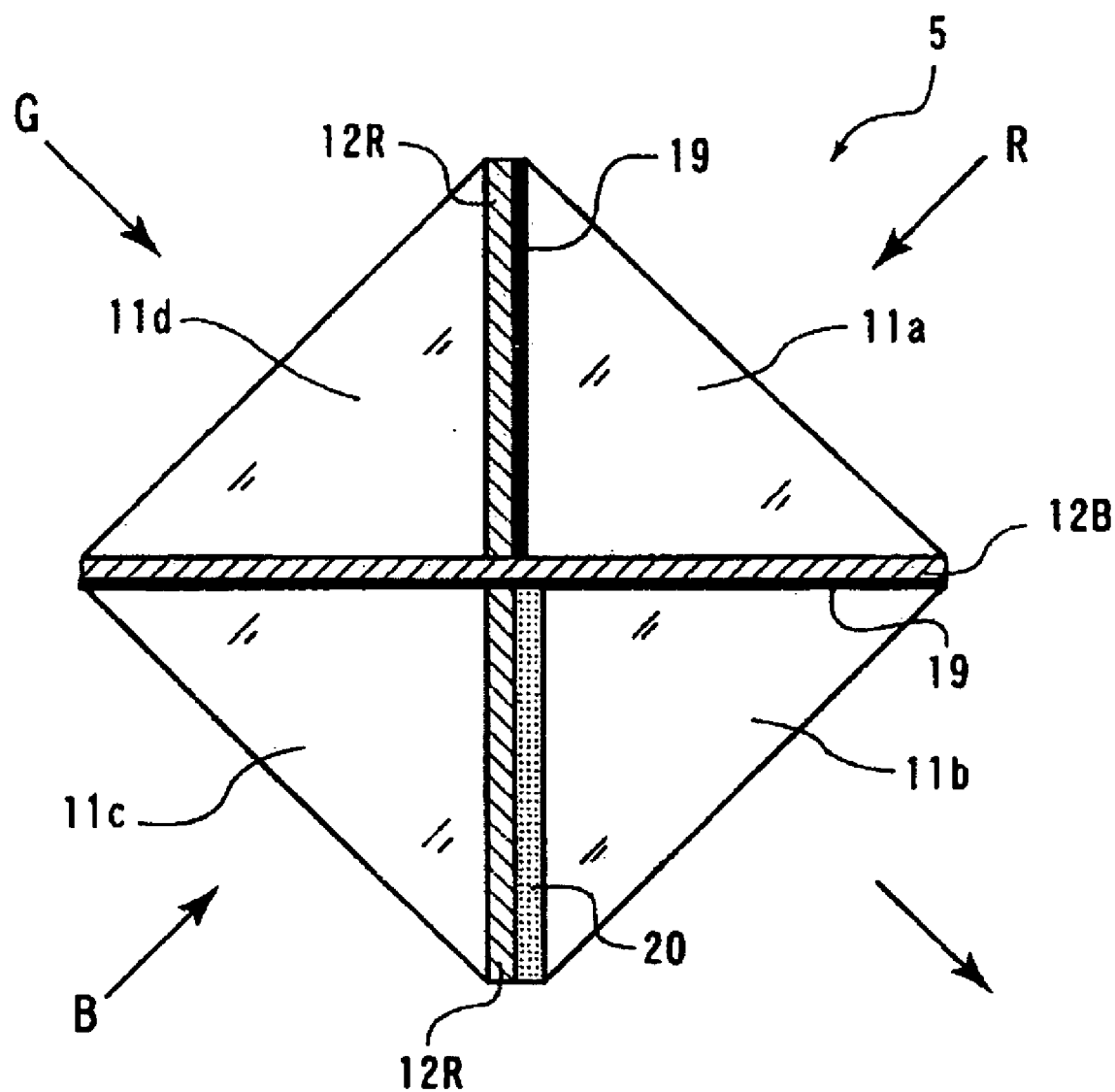
FIG. 9 is a sectional view showing a structure of a cross dichroic prism in a fifth embodiment of the invention.

Still another embodiment of the invention is shown in FIG. 9. In a cross dichroic prism 5 in this embodiment, the first prism element 11a to the fourth prism element 11d are used, the first prism pair 13a is manufactured by joining the first prism element 11a and the fourth prism element 11d according to the optical contact method by means of the dichroic film 12R (the first joining step), and the second prism pair 13b is manufactured by joining the second prism element 11b and the third prism element 11c via the adhesive layer 20 (the second joining step). Respective optical hypotenuse surfaces opposed to vertexes forming right angles of the first prism pair 13a and the second prism pair 13b are optically ground (the surface leveling step). The dichroic film 12B, which is made of a multilayer film and has silicon oxide layers in a first layer and an uppermost layer, is formed as a second multilayer film according to the evaporation method on the optical hypotenuse surface opposed to the right angles of the prism pair 13a that is one of the first prism pair 13a and the second prism pair 13b (the third film forming step). The dichroic film 12B is a continuous dichroic film formed over optical sides of the two prism elements. The respective optical hypotenuse surfaces of the first prism pair 13a and the second prism pair 13b are joined according to the optical contact method (the third joining step). This makes it possible to manufacture the cross dichroic prism 5 shown in FIG. 9.

In the cross dichroic prism 5, two prism pairs are manufactured by joining one prism pair according to the optical contact method and joining the other prism pair using an adhesive. As in the fourth embodiment, it is possible to join end faces of the respective dichroic films 12R orthogonal to the continuous dichroic film 12B, both a lowermost layer and an uppermost layer of which are made of silicon oxide layers, to the continuous dichroic film according to the optical contact method by means of contact between silicon oxide of the dichroic films 12R and silicon oxide of the continuous dichroic film 12B. It is possible to reduce an optical influence due to the presence of the end faces of the dichroic films 12R and improve optical uniformity. It is also possible to reduce an optical influence due to an adhesive layer because the adhesive layer is smaller than that in the fourth embodiment. It is also possible to reduce an optical influence due to end faces of the dichroic films using the continuous dichroic film.

Sixth Embodiment

Figure 10:
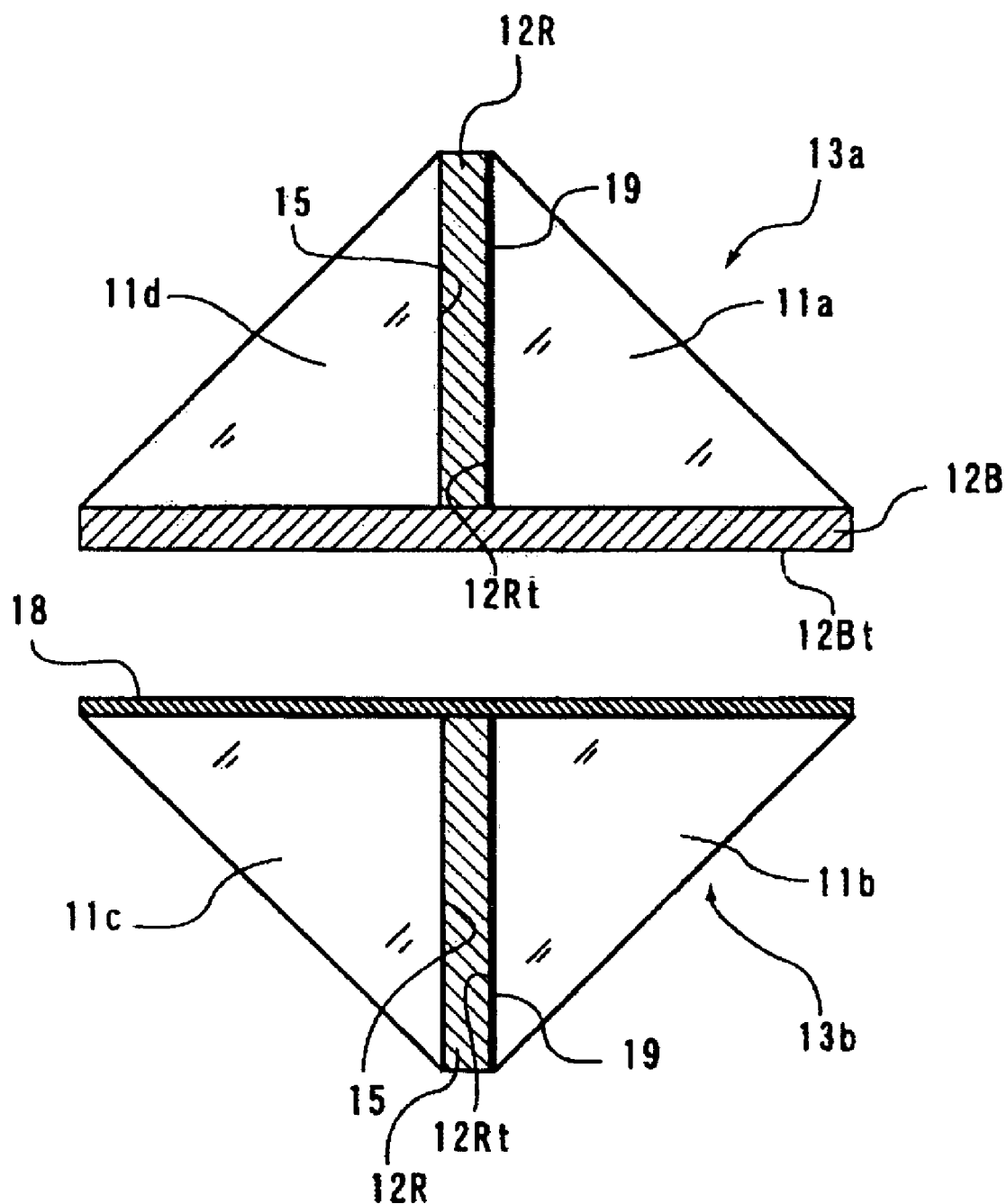
FIG. 10 is a sectional view showing a manufacturing process for a cross dichroic prism in a sixth embodiment of the invention.
Figure 11:
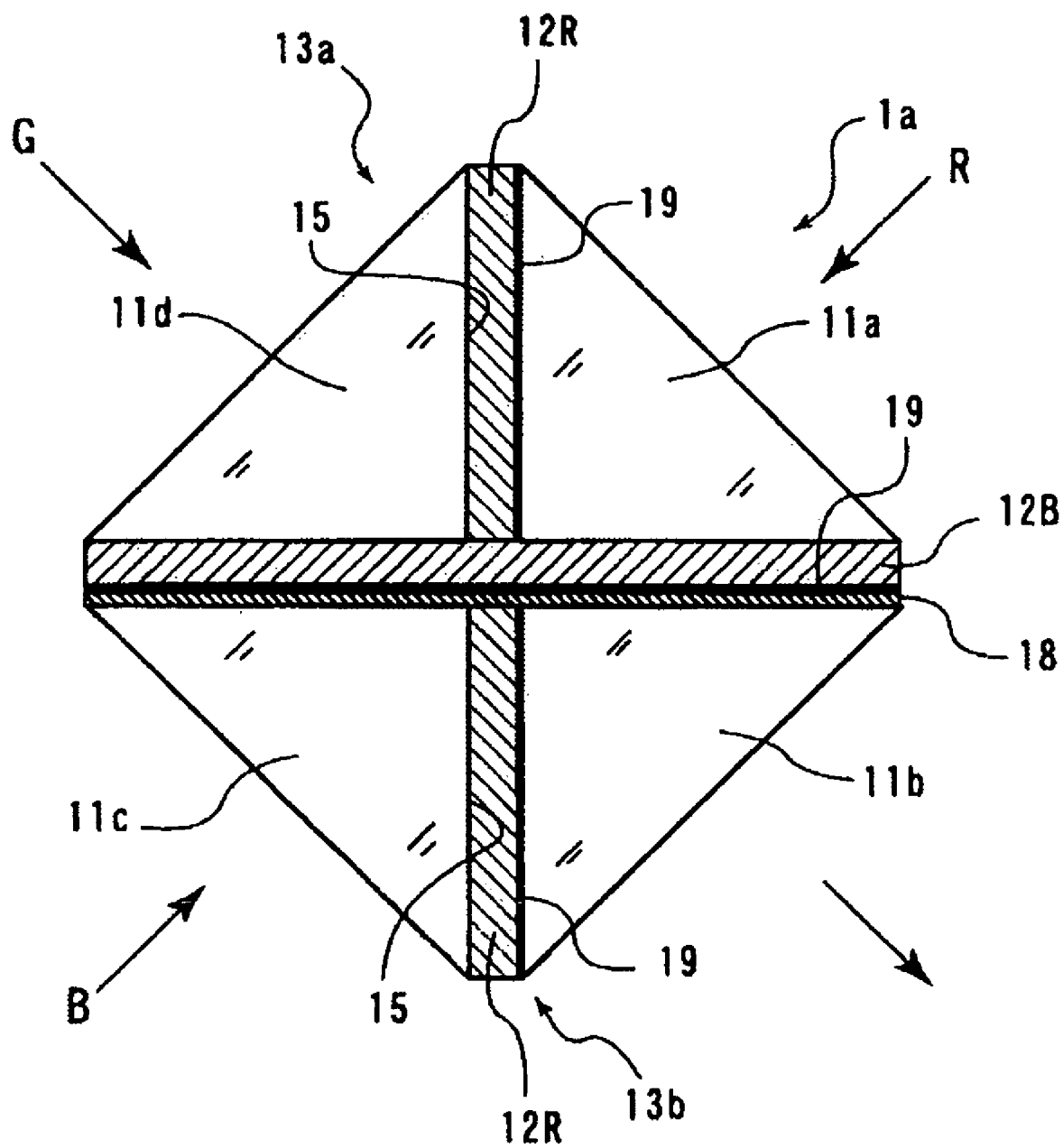
FIG. 11 is a sectional view showing a structure of the cross dichroic prism in the sixth embodiment of the invention.

Still another embodiment of the invention is shown in FIGS. 10 and 11. As in the first embodiment, a cross dichroic prism 1a in this embodiment is an example in which all junctions are joined according to the optical contact method to eliminate an influence of an adhesive layer. The cross dichroic prism 1a is different from that in the first embodiment in that, as shown in FIG. 10, in joining prism pairs, one layer of a silicon oxide layer 18 is provided on an optical hypotenuse surface of the second prism pair 13b on a side where the dichroic film 12B is not formed and, as shown in FIG. 11, the silicon oxide layer 18 and the silicon oxide layer 12Bt of the uppermost layer of the dichroic film 12B are joined according to optical contact method by means of contact between the silicon oxide layers. It is possible to form the silicon oxide layer 18 according to, for example, the evaporation method. It is preferable that thickness of the silicon oxide layer 18 is set in a range of 100 to 10000 angstroms.

It is possible to fill an end face of the dichroic film 12R provided in the second prism pair 13b to eliminate gaps by providing the silicon oxide layer 18 on the optical hypotenuse surface of the second prism pair 13b. An end face of the dichroic film 12R provided in the first prism pair 13a is filled by the dichroic film 12B and an inner side end face of the dichroic film 12R is integrated with the dichroic film 12B to reduce an optical influence due to the end faces.

Seventh Embodiment

Figure 12:
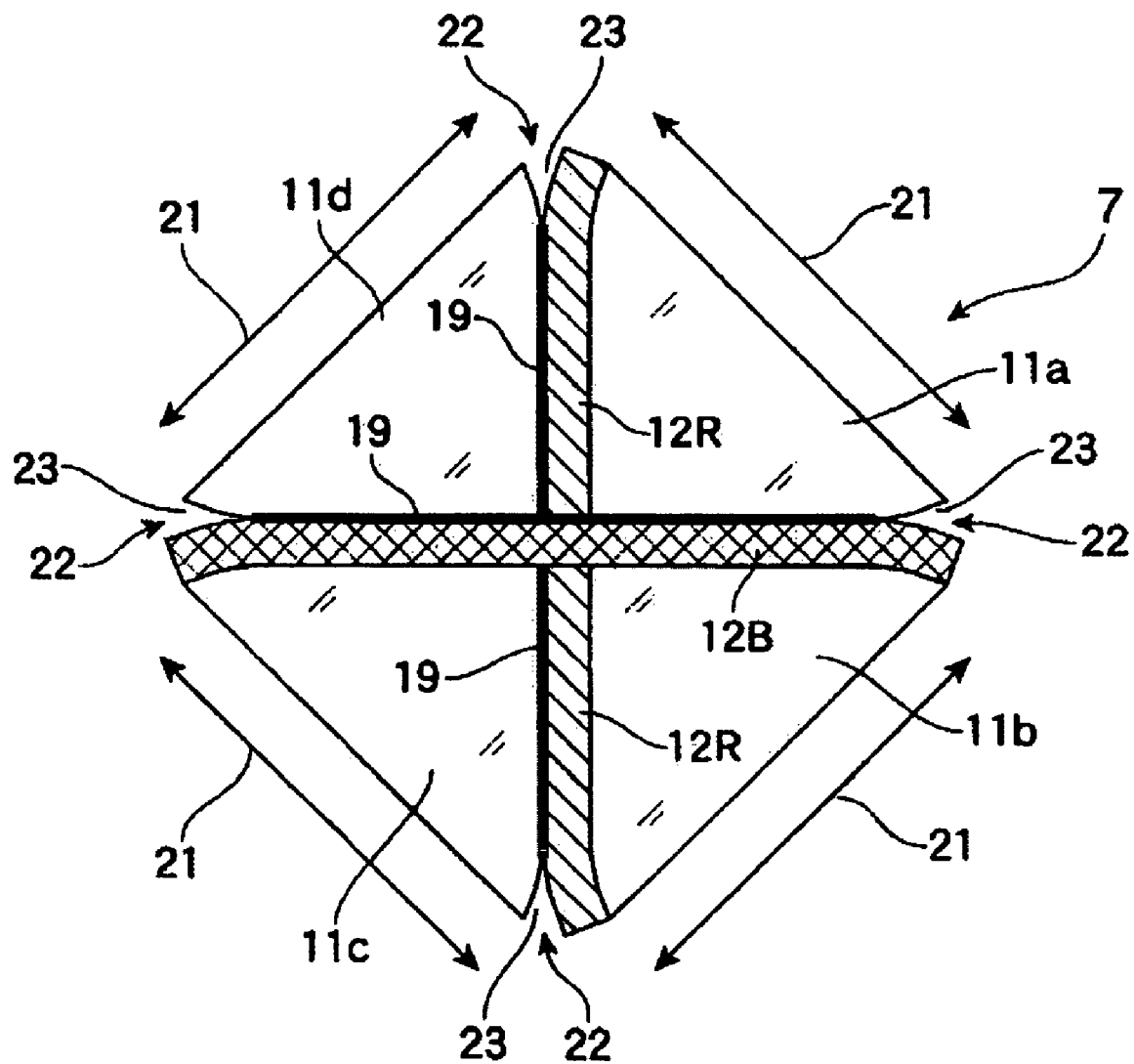
FIG. 12 is a sectional view showing a state in which gaps are formed at both ends of junctions in a manufacturing step for a cross dichroic prism in a seventh embodiment of the invention.
Figure 13:
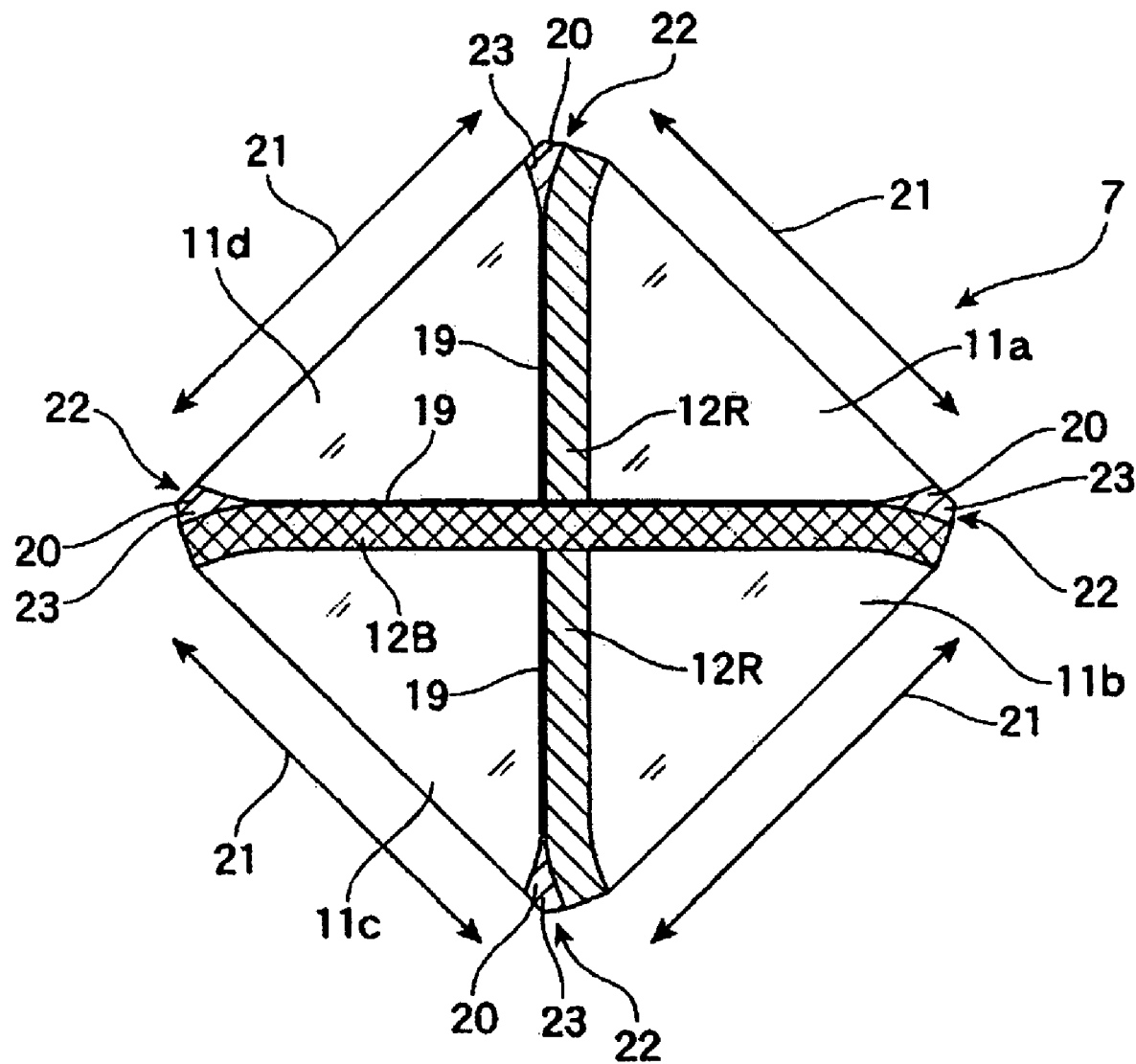
FIG. 13 is a sectional view showing a structure of the cross dichroic prism in the seventh embodiment of the invention.

Still another embodiment of the invention is shown in FIGS. 12 and 13. In a cross-dichroic prism 7 in this embodiment, as shown in FIG. 12, the first prism element 11a to the fourth prism element 11d are formed such that gaps 23 are formed at corner portions 22 on the outside of optically effective areas 21 of the junctions 14 to 17 of the prism elements when the prism elements are stuck together.

The outside of an optically effective area, for example, edges or corner portions of an optical product such as a prism manufactured by combining optical elements are not used as optical paths in many cases. Therefore, when the junctions 14 to 17 are joined according to the optical contact method, the corner portions 22 of the dichroic prism 7 are not in optical contact. Thereafter, as shown in FIG. 13, the gaps 23 are sealed by filling the adhesive 20 in the gaps 23. The optical adhesive UT20 is used as the adhesive 20 as in the embodiments described above. However, since it is attempted to bond the portions out of the optically effective areas 21, the portions do not need to be optically equivalent to the prisms 11a to 11d. For example, it is possible to use an adhesive that is opaque but has high bonding strength. It is possible to perform injection of the adhesive into the gaps 23 in the first joining step or the second joining step.

The corner portions 22 of the dichroic prism 7 are portions covered by a frame or the like that supports a dichroic prism in an applied apparatus such as a projector and are not used as the optically effective areas 21. Therefore, the portions 22 are bonded by the adhesive 20 and the portions corresponding to the optically effective areas 21 are joined according to the optical contact method. This makes it possible to add an effect of the adhesive 20 without deteriorating optical performance of the dichroic prism 7.

Adhering strength of surfaces joined according to the optical contact method is generally regarded as extremely strong. Adhering strength of the dichroic films 12R and 12B formed by evaporation is also high. Therefore, durability of the dichroic films 12R and 12B are considered to be sufficiently high against the dichroic prisms 1 and 2 described in the first or the second embodiment.

However, it is likely that the corner portions 22 are put in a support frame or stress concentration is mechanically applied to the corner portions 22. Since the corner portions 22 in the junctions are portions exposed to the outdoor air, the corner portions 22 are most susceptible to intrusion of moisture and a change in the outdoor air temperature. Therefore, the corner portions 22 out of the optically effective areas 21 are portions most easily peeled off. Therefore, it is possible to secure, using the joining method with high reliability adopted in the past, joining properties of the surfaces 14 to 17 joined according to the optical contact method by arranging the adhesive 20 in the portions 22 at the corners of the surfaces 14 to 17 joined according to the optical contact method. It is not usually conceivable that surfaces joined according to the optical contact method are peeled off from the centers or the inside of the surfaces. However, it is likely that peeling occurs on the surfaces joined according to the optical contact method because of a physical or chemical action from the edges of outer peripheries thereof. Therefore, it is possible to secure, using the joining method with high reliability adopted in the past, joining properties of the surfaces joined according to the optical contact method by arranging the adhesive in the portions at the edges of the surfaces joined according to the optical contact method. At the same time, it is possible to prevent deterioration in optical performance of the surfaces joined according to the optical contact method.

It is desirable to use an ultraviolet (UV) curing adhesive as the adhesive. Since edges or corner portions of an optical product that can be manufactured by combining optical elements are exposed on an outer surface of the optical product, even in the case of optical elements that do not transmit an ultraviolet ray, it is possible to join the optical elements using the UV curing adhesive that makes joining work easy. It is possible to use, without hindrance, a UV curing adhesive matching a refractive index of optical elements like the one currently available in the market if the optical elements transmit an ultraviolet ray.

Eighth Embodiment

Figure 14:
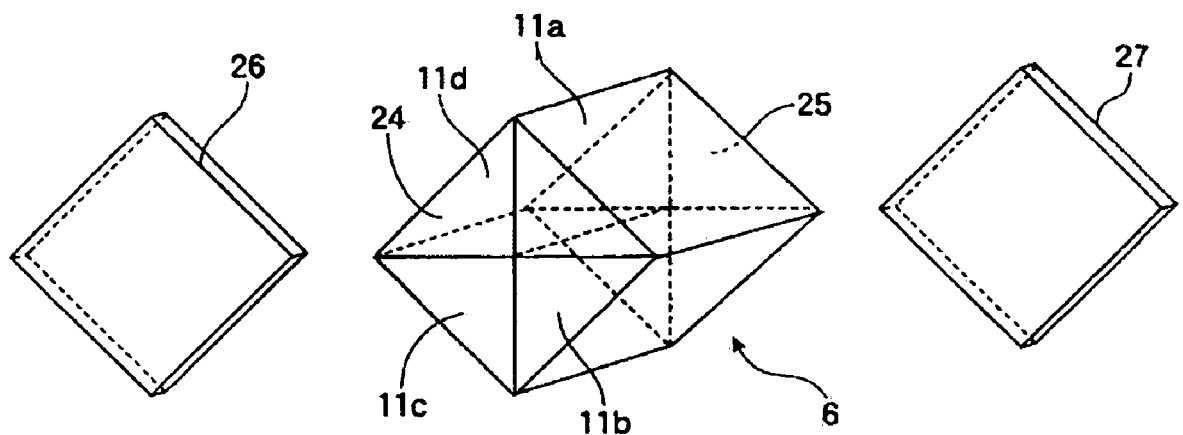
FIG. 14 is a sectional view showing a manufacturing step for a cross dichroic prism in an eighth embodiment of the invention and is a perspective view showing a state in which reinforcing plates are stuck to both upper and lower ends of the cross dichroic prism.
Figure 15:
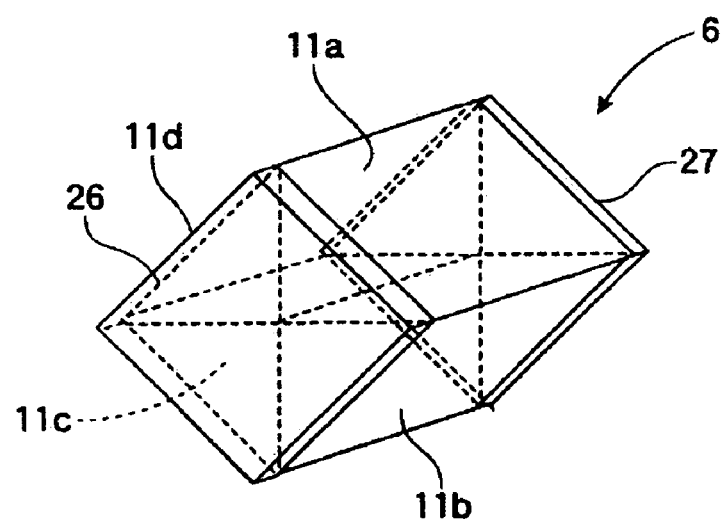
FIG. 15 is a perspective view showing a structure of the cross dichroic prism in the eighth embodiment of the invention.

Still another embodiment of the invention is shown in FIGS. 14 and 15. In a cross dichroic prism 6 in this embodiment, as shown in FIG. 14, reinforcing plates 26 and 27 for support are further stuck to upper and lower surfaces 24 and 25 of the dichroic prism 6, which is manufactured from the first prism element 11a to the fourth prism element 11d, by an adhesive. It is possible to reinforce joining of the first prism element 11a to the fourth prism element 11d using the reinforcing plates 26 and 27 that are joined on upper and lower surfaces of the four prism elements 11a to 11d to extend over all of these prism elements. As a result, it is possible to prevent the junctions 14 to 17 from being peeled apart.

It is desirable that the reinforcing plates 26 and 27 are manufactured from a member same as the member of the first prism element 11a to the fourth prism element 11d, that is, BK7. By using the member in common, it is possible to set coefficients of thermal expansion of the reinforcing plates and the prism elements the same. This makes it possible to prevent occurrence of thermal strain. It is also possible to prevent stray light traveling in the directions of the reinforcing plates 26 and 27 from being reflected by the reinforcing plates and emit the light to the outside from the dichroic prism 6. Basically, upper and lower portions of the dichroic prism 6 are out of the optical effective areas 21 in the same manner as the corner portions 22. Thus, a material of the reinforcing plates 26 and 27 do not need to be a material optically equivalent to that of the prisms 11a to 11d. It is possible to form the reinforcing plates 26 and 27 using a member that is opaque but has high strength.

Effects of the dichroic prisms according to the embodiments of the invention are shown in FIGS. 16 to 20 in comparison with dichroic prisms that are manufactured without using the optical contact method.

Figure 16:
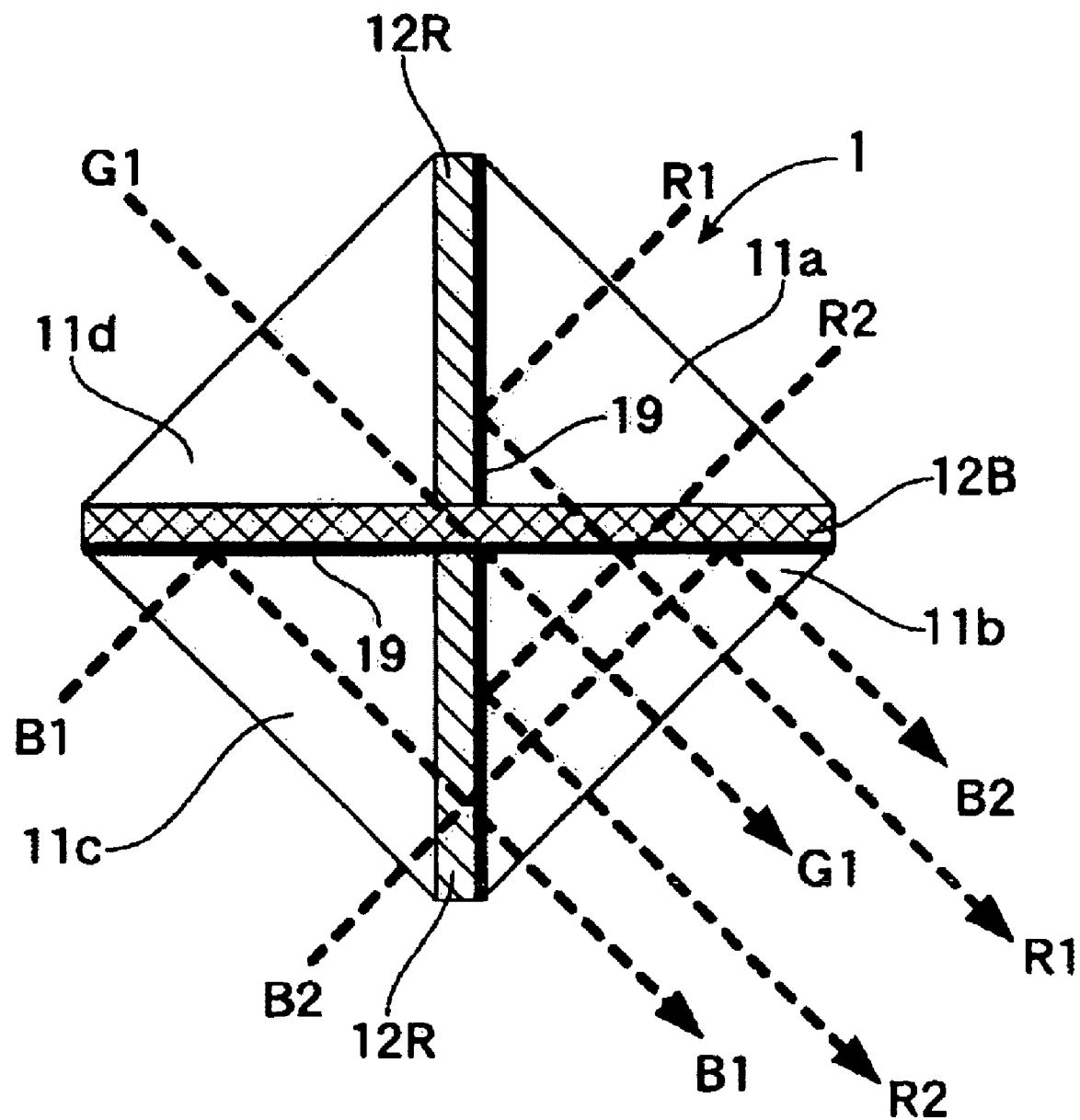
FIG. 16 is an optical path diagram showing a state in which an image of red R, an image of blue B, and an image of green G are combined using the cross dichroic prism in the first embodiment of the invention shown in FIG. 1.
Figure 17:
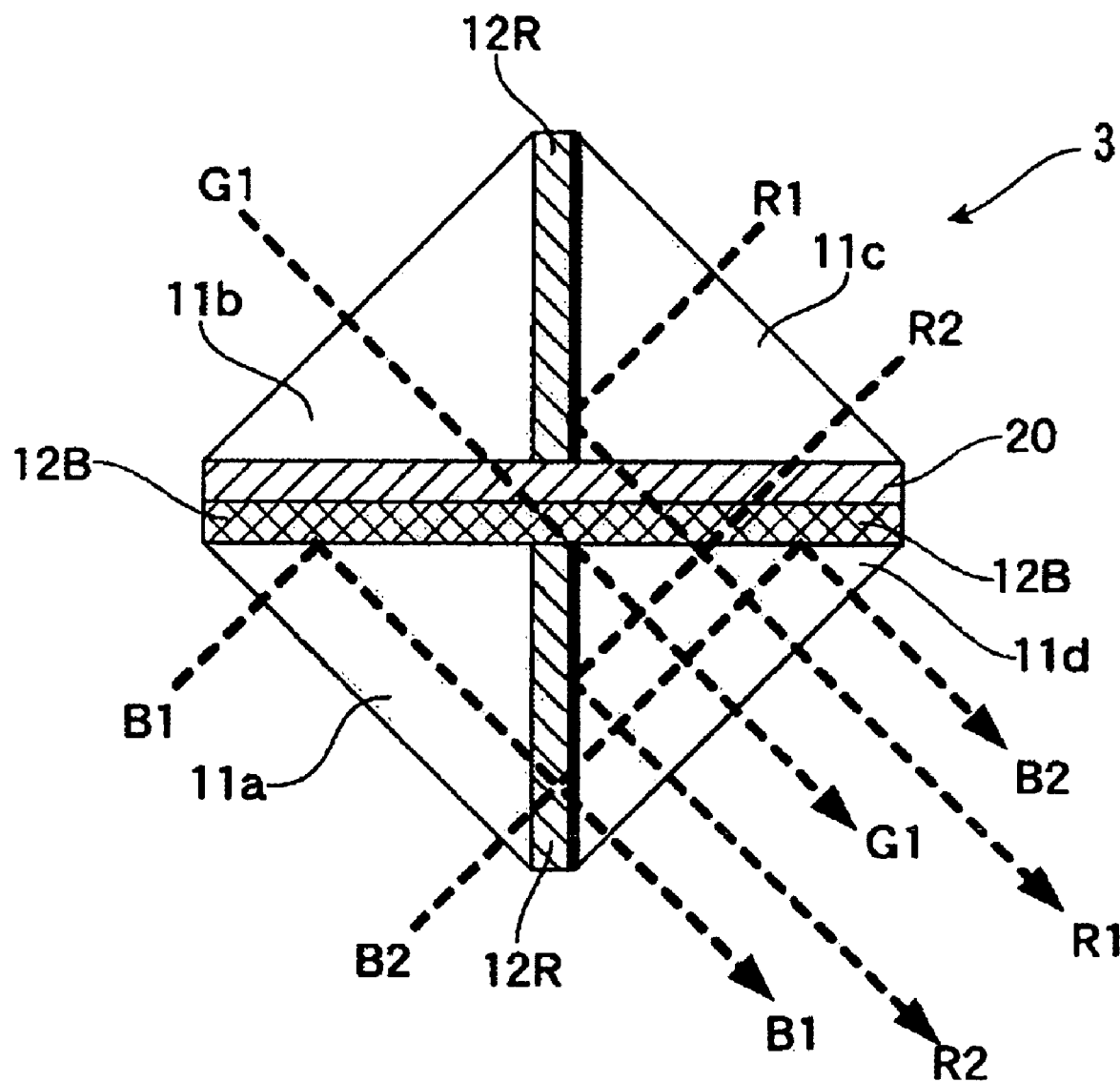
FIG. 17 is an optical path diagram showing a state in which an image of red R, an image of blue B, and an image of green G are combined using the cross dichroic prism in the third embodiment of the invention shown in FIG. 7.
Figure 18:
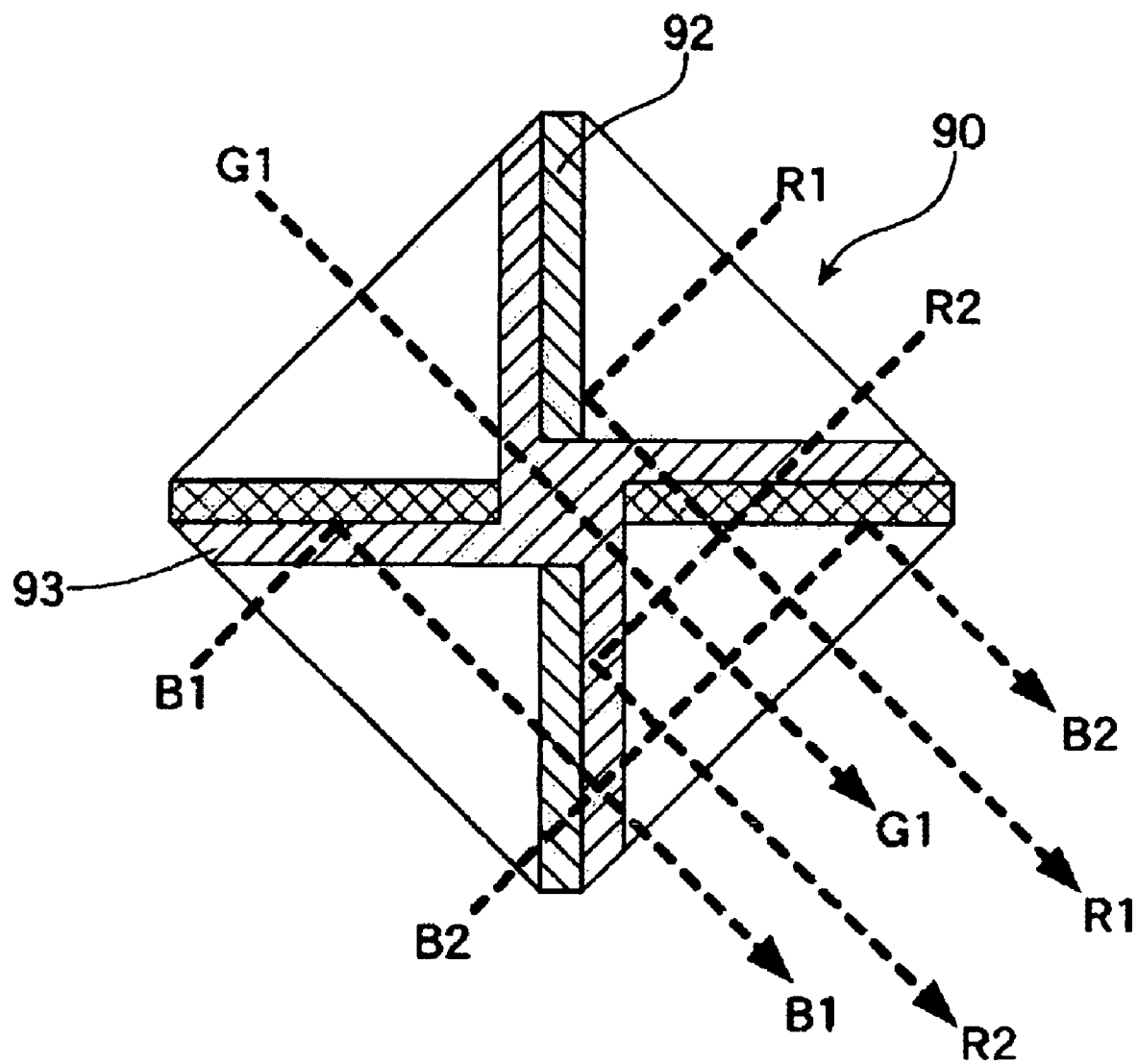
FIG. 18 is an optical path diagram showing a state in which an image of red R, an image of blue B, and an image of green G are combined using a cross dichroic prism in a comparative example 1 shown in FIG. 22.
Figure 19:
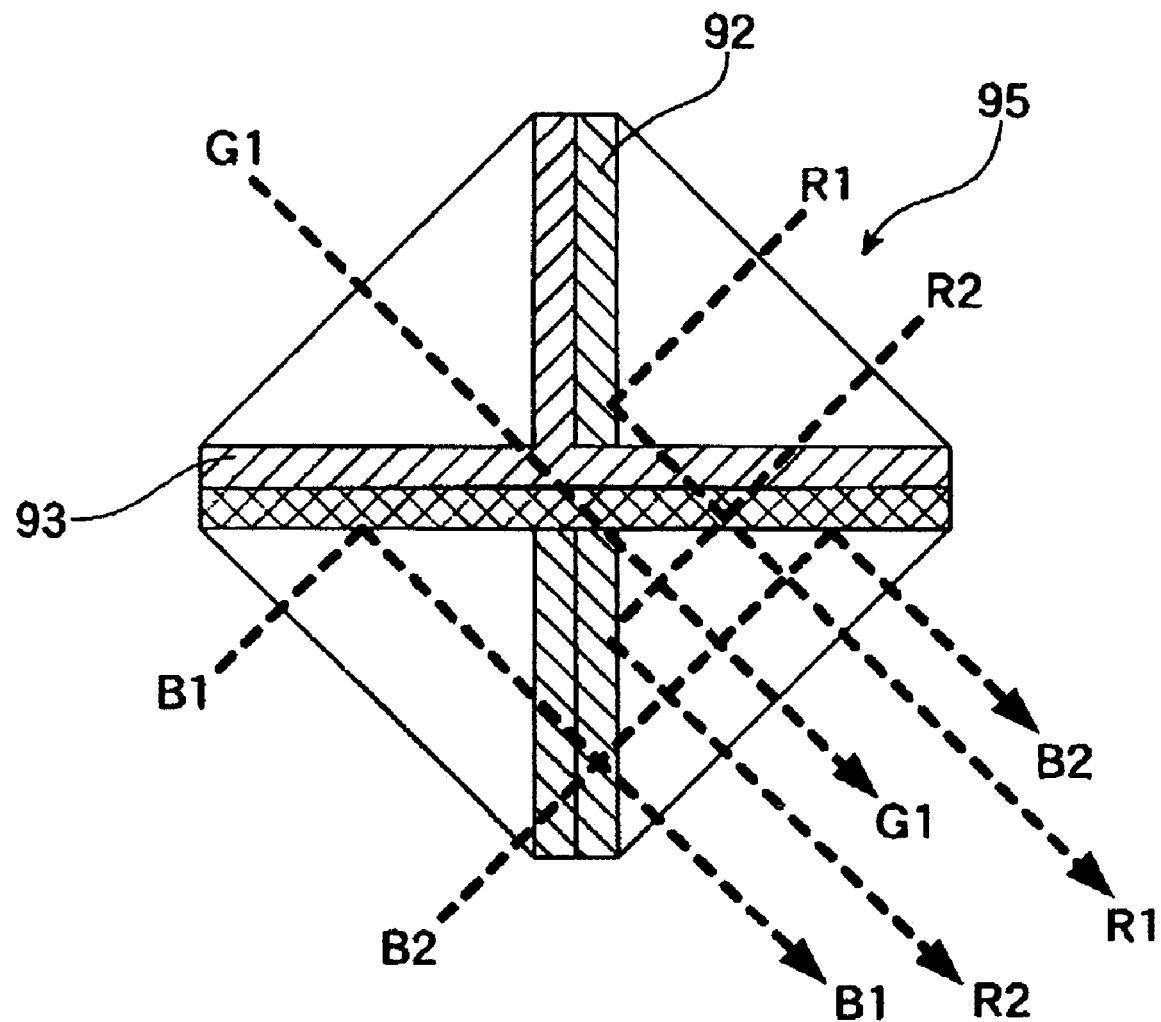
FIG. 19 is an optical path diagram showing a state in which an image of red R, an image of blue B, and an image of green G are combined using a cross dichroic prism in a comparative example 2 shown in FIG. 23.
Figure 23:
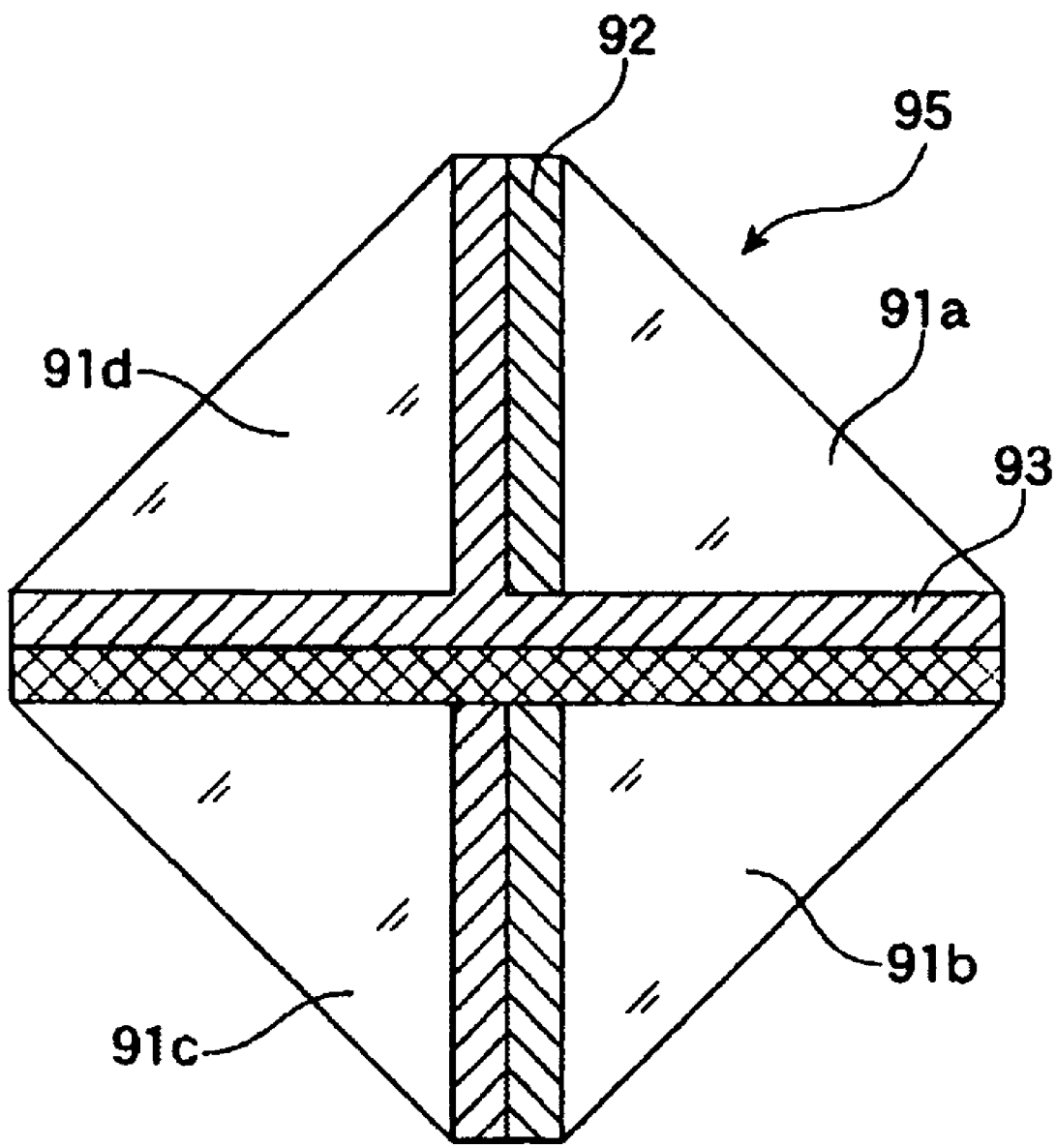
FIG. 23 is a sectional view showing a constitution of a cross dichroic prism in a comparative example 2.

FIG. 16 shows a state in which an image of red R, an image of blue B, and an image of green G are combined using the dichroic prism 1 in the first embodiment of the invention shown in FIG. 1. FIG. 17 shows a state in which an image of red R, an image of blue B, and an image of green G are combined using the dichroic prism 3 in the third embodiment of the invention shown in FIG. 7. FIG. 18 shows, as a comparative example 1, a state in which an image of red R, an image of blue B, and an image of green G are combined using a dichroic prism 90 shown in FIG. 22. FIG. 19 shows, as a comparative example 2, a state in which an image of red R, an image of blue B, and an image of green G are combined using a dichroic prism 95 shown in FIG. 23.

Moreover, the numbers of times rays R1 and R2 of the image of red R, rays B1 and B2 of the image of blue B, and a ray G1 of the image of green G traverse an adhesive layer, which causes deterioration in the images, in combining the images in the respective dichroic prisms 1, 3, 90, and 95 are put in order in FIG. 20.

As shown in FIG. 20, in the dichroic prism 1 not including a layer of an adhesive, all the rays do not traverse the layer of the adhesive. Thus, it is possible to completely eliminate deterioration in an image quality due to the layer of the adhesive. On the other hand, in the dichroic prism 3, although a part of the rays traverse the layer of the adhesive, it is possible to hold the number of times of traversing to a minimum number of times, that is, one time. Thus, it is possible to minimize deterioration in the images. In this way, in the embodiments of the invention, in an optical product with a multilayer film held therein like a cross dichroic prism, it is possible to minimize or eliminate an influence of an adhesive like blurring of an image and occurrence of double images. This makes it possible to provide a dichroic prism with extremely high optical performance.

The optical product in the first aspect of the invention is usable as a dichroic prism used for color separation and color combination by a projector.

The method of manufacturing an optical product according to the second aspect of the invention is usable in a field of manufacturing of a high-performance cross dichroic prism in which an influence of an adhesive layer is eliminated as much as possible.

What is claimed is:

1. A cross dichroic prism that includes a first prism element, a second prism element, a third prism element, and a fourth prism element, wherein each of the first prism element, the second prism element, the third prism element, and the fourth prism element comprise a glass element shaped as a right isosceles triangle right prism, and respective optical sides of the first prism element, the second prism element, the third prism element, and the fourth prism element adjacent to one another among optical sides orthogonal to one another are joined via dichroic films made of multilayer films, the cross dichroic prism comprising:

a first junction between a first optical side of the first prism element and a first optical side of the second prism element;

a second junction between a second optical side of the second prism element and a first optical side of the third prism element;

a third junction between a second optical side of the third prism element and a first optical side of the fourth prism element; and a fourth junction between a second optical side of the fourth prism element and a second optical side of the first prism element, wherein an uppermost layer of a dichroic film provided in at least one of the first to the fourth junctions comprises a silicon oxide layer, wherein the silicon oxide layer is optically connected, via a first joint, to an optical side of a prism element among the first to the fourth prism elements that opposes the silicon oxide layer, wherein a first dichroic film in the first junction and a third dichroic film in the third junction are a continuous dichroic film that are continuous over the first junction and the third junction, wherein each of an end face of a second dichroic film in the second junction and an end face of a fourth dichroic film in the fourth junction is joined to the continuous dichroic film, wherein a lowermost layer and an uppermost layer of the continuous dichroic film comprise silicon oxide layers, wherein the silicon oxide layer of the uppermost layer of the continuous dichroic film provided in the first junction and the third junction, the first optical side of the second prism element, and the second optical side of the third prism element are joined according to the optical contact method at the first junction and the third junction, respectively, and a silicon oxide layer of the second dichroic film and the fourth dichroic film provided in each of the second junction and the fourth junction, and the second optical side of the second prism element and the second optical side of the first prism element are joined according to the optical contact method at the second junction and fourth junction, respectively.

2. The cross dichroic prism according to claim 1, wherein a continuous silicon oxide layer is directly disposed on the first optical side of the second prism element, the second optical side of the third prism element, and an end face of the second dichroic film provided in the second junction, and the continuous silicon oxide layer and the continuous dichroic film are joined according to the optical contact method.

3. The cross dichroic prism according to claim 1, wherein gaps are provided on an outside of optically effective areas of one or more of the first junction, the second junction, the third junction, and the fourth junction and an adhesive is filled in the gaps.

4. The cross dichroic prism according to claim 1, wherein reinforcing members are joined to upper surfaces and/or lower surfaces of the first prism element, the second prism element, the third prism element, and the fourth prism element to extend over the respective prism elements.

5. The cross dichroic prism according to 1, wherein the silicon oxide layer is configured to act as an optical component of the cross dichroic prism.

6. A cross dichroic prism that includes a first prism element, a second prism element, a third prism element, and a fourth prism element, wherein each of the first prism element, the second prism element, the third prism element, and the fourth prism element comprise a glass element shaped as a right isosceles triangle right prism, and respective optical sides of the first prism element, the second prism element, the third prism element, and the fourth prism element adjacent to one another among optical sides orthogonal to one another are joined via dichroic films made of multilayer films, the cross dichroic prism comprising:

a first junction between a first optical side of the first prism element and a first optical side of the second prism element;

a second junction between a second optical side of the second prism element and a first optical side of the third prism element;

a third junction between a second optical side of the third prism element and a first optical side of the fourth prism element; and a fourth junction between a second optical side of the fourth prism element and a second optical side of the first prism element, wherein an uppermost layer of a dichroic film provided in at least one of the first to the fourth junctions comprises a silicon oxide layer, wherein the silicon oxide layer is optically connected, via a first joint, to an optical side of a prism element among the first to the fourth prism elements that opposes the silicon oxide layer, wherein a first dichroic film in the first junction and a third dichroic film in the third junction are a continuous dichroic film that are continuous over the first junction and the third junction, wherein a silicon oxide layer of an uppermost layer of a second dichroic film provided in the second junction and the second optical side of the second prism element are joined by a first adhesive layer at the second junction, and a silicon oxide layer of an uppermost layer of a fourth dichroic film provided in the fourth junction and the second optical side of the first prism element are joined by a second adhesive layer at the fourth junction, wherein a lowermost layer and an uppermost layer of the continuous dichroic film comprise silicon oxide layers, and the uppermost layer of the continuous dichroic film provided in the first junction and the third junction is joined with the first optical side of the first prism element according to the optical contact method at the first junction and the third junction.

* * * * *